(12) United States Patent
Tan et al.

(10) Patent No.: US 12,116,110 B2
(45) Date of Patent: Oct. 15, 2024

(54) SYSTEMS AND METHODS FOR MODULATING AERODYNAMIC LOADS ON AIRFOILS

(71) Applicant: Georgia Tech Research Corporation, Atlanta, GA (US)

(72) Inventors: Yuehan Tan, Atlanta, GA (US); Ari Glezer, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 270 days.

(21) Appl. No.: 17/554,571

(22) Filed: Dec. 17, 2021

(65) Prior Publication Data

US 2022/0153405 A1     May 19, 2022

Related U.S. Application Data

(63) Continuation of application No. 17/175,552, filed on Feb. 12, 2021, now abandoned, which is a continuation of application No. 16/899,082, filed on Jun. 11, 2020, now abandoned.

(60) Provisional application No. 62/859,789, filed on Jun. 11, 2019.

(51) Int. Cl.
*B64C 21/04*      (2023.01)

(52) U.S. Cl.
CPC .......... *B64C 21/04* (2013.01); *B64C 2230/18* (2013.01)

(58) Field of Classification Search
CPC ....... B64C 21/02; B64C 21/025; B64C 21/04; B64C 21/06; B64C 21/08; B64C 2230/04
USPC ................................ 244/206, 207, 208, 209
See application file for complete search history.

(56) References Cited

U.S. PATENT DOCUMENTS

| | | | | |
|---|---|---|---|---|
| 3,148,691 | A * | 9/1964 | Greenblott | F15C 1/04 251/5 |
| 5,531,406 | A * | 7/1996 | Redekopp | B64C 21/025 244/209 |
| 7,128,082 | B1 * | 10/2006 | Cerretelli | B05B 7/0075 137/833 |
| 10,737,796 | B2 * | 8/2020 | Gruber | B64D 27/20 |
| 2006/0273197 | A1 * | 12/2006 | Saddoughi | F15D 1/12 239/265.17 |
| 2016/0272301 | A1 * | 9/2016 | Shmilovich | B64C 21/08 |
| 2016/0280358 | A1 * | 9/2016 | Lin | B64C 23/06 |
| 2021/0331784 | A1 * | 10/2021 | Lin | B64C 13/40 |

\* cited by examiner

*Primary Examiner* — Michael C Zarroli
*Assistant Examiner* — Ryan Andrew Yankey
(74) *Attorney, Agent, or Firm* — Troutman Pepper Hamilton Sanders LLP; Ryan A. Schneider; Stephanie J. Remy

(57) ABSTRACT

An embodiment of the present disclosure provides an airfoil comprising a trailing edge, a first fluidic outlet, and a first fluid supply. The trailing edge can have a first surface and a second surface opposing the first surface. The first fluidic outlet can be positioned on one of the first or second surfaces. The first fluid supply can be configured to eject a fluid out of the first fluidic outlet to alter an aerodynamic load experienced by the airfoil.

20 Claims, 13 Drawing Sheets

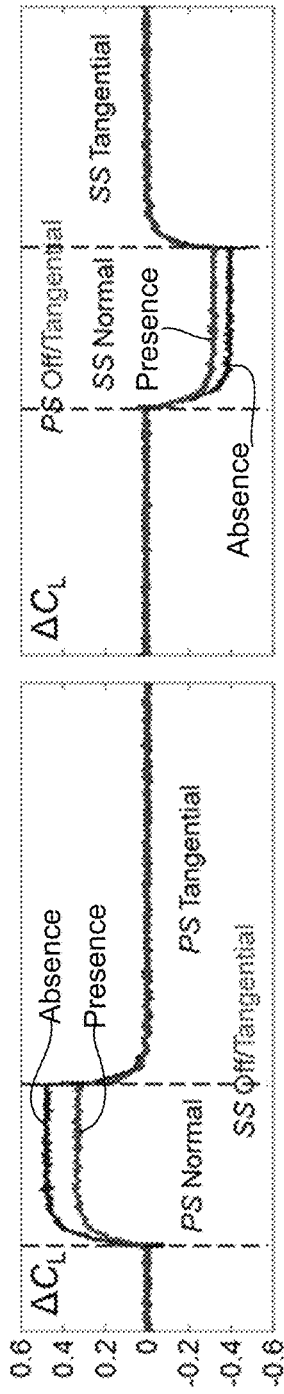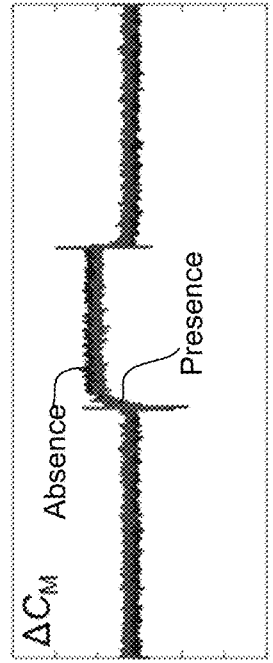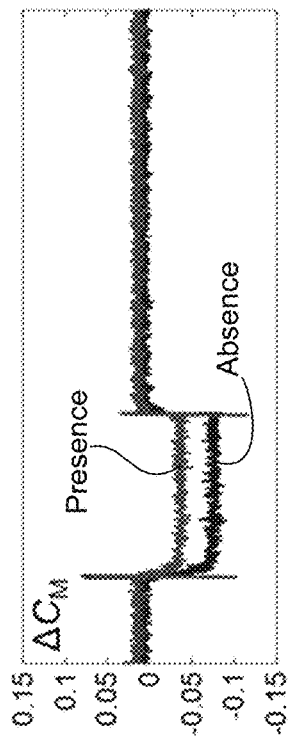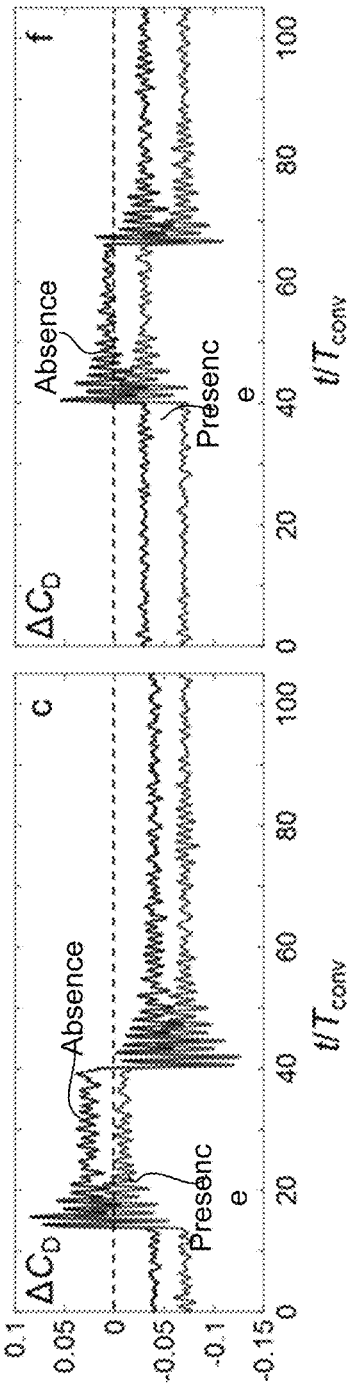

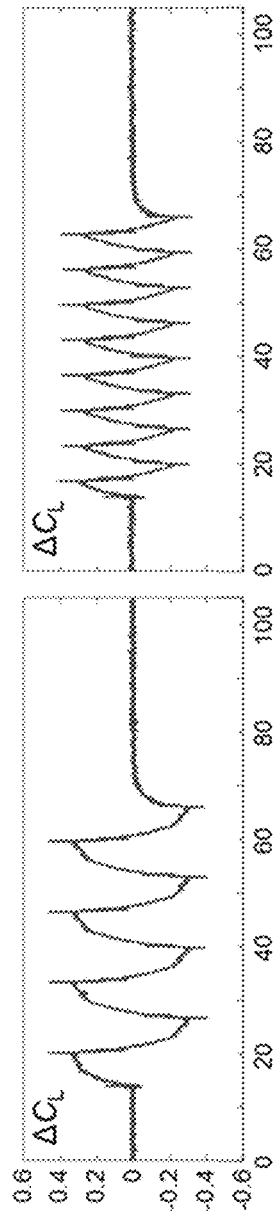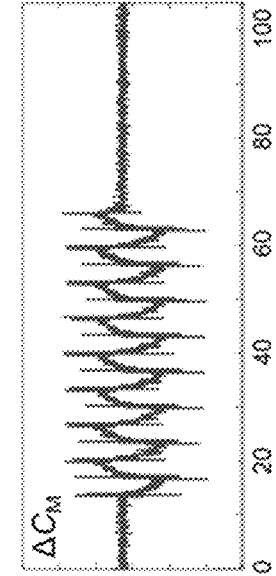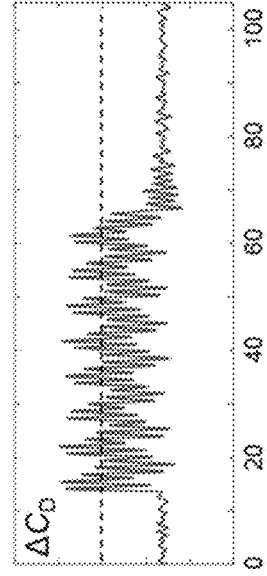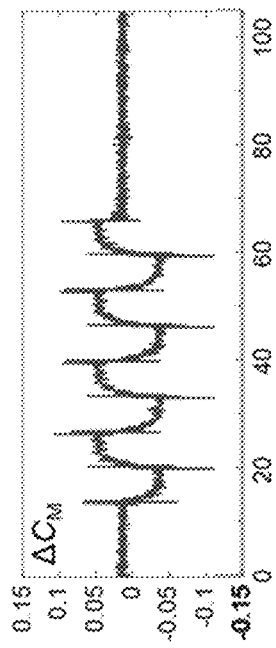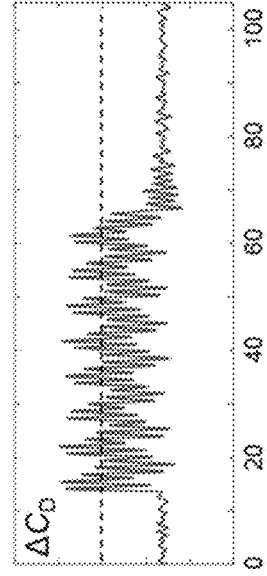
FIG. 10A  FIG. 10B  FIG. 10C  FIG. 10D  FIG. 10E  FIG. 10F

SYSTEMS AND METHODS FOR MODULATING AERODYNAMIC LOADS ON AIRFOILS

CROSS-REFERENCE TO RELATED APPLICATIONS

This application is a continuation of U.S. Non-Provisional application Ser. No. 17/175,552, filed on 12 Feb. 2021, which is a continuation of U.S. Non-Provisional application Ser. No. 16/899,082, 11 Jun. 2020, which claims the benefit of U.S. Provisional Application Ser. No. 62/859,789, filed on 11 Jun. 2019, each of which are incorporated herein by reference in their entireties as if fully set forth below.

STATEMENT REGARDING GOVERNMENT SPONSORED RESEARCH

This invention was made with government support under Award No. W911W6-17-2-0002, awarded by the Department of Defense. The government has certain rights in the invention.

FIELD OF THE DISCLOSURE

The various embodiments of the present disclosure relate generally to fluidic-based actuators for controlling an airfoil's aerodynamic performance.

BACKGROUND

Active Flow Control (AFC) technology has the ability to alter an object's aerodynamic characteristics without the need for any moving control surfaces. It is an attractive alternative to traditional mechanical control devices because it is unburdened with complex electro-mechanical moving parts and therefore free of the extra power requirement, weight and drag penalties that often come with moving mechanical control surfaces.

AFC technologies over lifting surfaces (e.g., airfoils) have traditionally focused on mitigation of partial or complete flow separation over stalled wing sections or flaps for improved aerodynamic performance. As demonstrated in a number of earlier investigations, the separating shear layer is dominated by a strong coupling to instabilities of the near wake and, therefore, control efforts have relied on the receptivity of this wake-coupled instability to various forms of fluidic actuation. A different approach to separation control, which is decoupled from the global flow (wake) instabilities, relies on fluidic modification of the "apparent" aerodynamic shape of the surface using arrays of surface-mounted jet actuators operating at frequencies that are at least an order of magnitude higher than the characteristic flow frequency of the separated flow. More recently, the utility of transitory, pulsed fluidic actuation that exploits time scales that are significantly shorter than the characteristic advection time of the separated flow ($O(0.05\ T_{conv})$) has also been demonstrated and successfully applied for control of both static and dynamic stall.

Flow control approaches that are decoupled from the global instability of the base flow have been extended to control of the aerodynamic loads in the absence of separation at low to moderate angles of attack when the base flow is fully attached. A conventional approach exploited controlled trapped vorticity concentration downstream of surface-mounted miniature obstruction integrated with an actuation jet (cross-stream scale $O(0.01\ c)$) on airfoils' suction and pressure surfaces for controlling the global aerodynamic loads. In particular, this approach was used for manipulating the Kutta condition near the trailing edge over a range of angles of attack for bi-directional control of the pitching moment.

Conventional AFC technologies, however, have two limitations. First and foremost, conventional active flow control is largely ineffective when applied in the absence of flow separation. Second, most conventional AFC devices lack the ability to bi-directionally modulate the aerodynamic loads, i.e., they can only either increase or decrease lift, but not both. But these capabilities can be desirable because most aircrafts do not operate under stalled conditions for the majority of their mission durations, while the need for aerodynamic performance augmentation can still arise during normal cruise conditions (without stall), such as providing extra lift capacity and fuel conservation. Also, bi-directional aerodynamic control can be useful for applications such as on-blade active vibration suppression which requires bi-directional forcing on the airfoil. For example, a conventional system employed rotorcraft on-blade vibration reduction systems that relied on mechanically oscillating micro-flaps. While this system showed considerable promise, its complexity hindered its implementation, suggesting that AFC could offer an easier adaptation.

Therefore, a desire exists in the field for a novel fluidic actuator capable of extending the operability of AFC to fully attached flow regimes. There is also a desire to have the ability to augment the existing aerodynamic performance in both directions (i.e., increase and decrease lift and pitching moment). Finally, there is a desire to have significant power and drag advantage over conventional mechanical controls and while posing no additional drag penalties when not in use. The embodiments disclosed herein address one or more of these desires.

BRIEF SUMMARY

An exemplary embodiment of the present disclosure provides an airfoil comprising a trailing edge, a first fluidic outlet, and a first fluid supply. The trailing edge can have a first surface and a second surface opposing the first surface. The first fluidic outlet can be positioned on one of the first or second surfaces. The first fluid supply can be configured to eject a fluid out of the first fluidic outlet to alter an aerodynamic load experienced by the airfoil.

In any of the embodiments disclosed herein, the first fluidic outlet can be positioned on the first surface of the trailing edge, and the first fluidic outlet can be configured such that fluid ejected from the first fluidic outlet can be ejected in a direction tangential to the first surface of the trailing edge.

In any of the embodiments disclosed herein, a second fluidic outlet can be positioned on the first surface of the trailing edge, the third fluidic outlet can be configured such that fluid ejected from the first fluidic outlet can be ejected in a direction normal to the first surface of the trailing edge, and the first fluid supply can be further configured to eject a fluid out of the second fluidic outlet.

In any of the embodiments disclosed herein, The airfoil can further comprise first and second control jets configured to cause the fluid from the first fluid supply to be ejected from only one of the first fluidic outlet and the second fluidic outlet at a predetermined time.

In any of the embodiments disclosed herein, the airfoil can further comprise a first mixing chamber in fluid communication with the first and second control jets, the first fluid supply, the first fluidic outlet, and the second fluidic outlet, and the first mixing chamber can be configured such that when fluid is ejected from the first control jet, fluid from the first control jet and first fluid supply can enter the first mixing chamber, exit the first mixing chamber, and be ejected from the first fluidic outlet, and when fluid is ejected from the second control jet, fluid from the second control jet and first fluid supply can enter the first mixing chamber, exit the first mixing chamber, and be ejected from the second fluidic outlet.

In any of the embodiments disclosed herein, the airfoil can further comprise a first bypass switch in fluid communication with the first and second fluidic outlets. The first bypass switch can be configured to toggle between a first position in which fluid from the first fluid supply is ejected from the first fluidic outlet, a second position in which fluid from the first fluid supply is ejected from the second fluidic outlet, and a third position in which fluid from the first fluid supply is ejected from neither the first fluidic outlet nor the second fluidic outlet.

In any of the embodiments disclosed herein, the airfoil can further comprise a controller configured to control the first and second control jets and the first bypass switch to alter whether fluid is ejected from first fluidic outlet, second fluidic outlet, or neither the first nor the second fluidic outlet.

In any of the embodiments disclosed herein, The airfoil can further comprise a third fluidic outlet, a fourth fluidic outlet, and a second fluid supply. The third fluidic outlet can be on the second surface of the trailing edge. The fourth fluidic outlet can be on the second surface of the trailing edge. The second fluid supply can be configured to eject a fluid out of the third fluidic outlet and fourth fluidic outlet to alter an aerodynamic load experienced by the airfoil. The third fluidic outlet can be configured such that fluid ejected from the third fluidic outlet is ejected in a direction tangential to the second surface of the trailing edge. The fourth fluidic outlet can be configured such that fluid ejected from the fourth fluidic outlet is ejected in a direction normal to the second surface of the trailing edge.

In any of the embodiments disclosed herein, the airfoil can further comprise third and fourth control jets configured to cause the fluid from the second fluid supply to be ejected from only one of the third fluidic outlet and the fourth fluidic outlet at a predetermined time.

In any of the embodiments disclosed herein. The airfoil can further comprise a second mixing chamber in fluid communication with the third and fourth control jets, the second fluid supply, the third fluidic outlet, and the fourth fluidic outlet. The second mixing chamber can be configured such that when fluid is ejected from the third control jet, fluid from the third control jet and second fluid supply enters the second mixing chamber, exits the second mixing chamber, and is ejected from the third fluidic outlet, and when fluid is ejected from the fourth control jet, fluid from the fourth control jet and second fluid supply enters the second mixing chamber, exits the second mixing chamber, and is ejected from the fourth fluidic outlet.

In any of the embodiments disclosed herein, the airfoil can further comprise a second bypass switch in fluid communication with the third and fourth fluidic outlets. The second bypass switch can be configured to toggle between a first position in which fluid from the second fluid supply is ejected from the third fluidic outlet, a second position in which fluid from the second fluid supply is ejected from the fourth fluidic outlet, and a third position in which fluid from the second fluid supply is ejected from neither the third fluidic outlet nor the fourth fluidic outlet.

In any of the embodiments disclosed herein, the airfoil can further comprise a controller configured to control the third and fourth control jets and the second bypass switch to alter whether fluid is ejected from third fluidic outlet, fourth fluidic outlet, or neither the third nor the fourth fluidic outlet.

In any of the embodiments disclosed herein, the fluid can be a compressible fluid.

In any of the embodiments disclosed herein, the fluid can be air

In any of the embodiments disclosed herein, the airfoil does not comprise a flap.

Another embodiment of the present disclosure provides an airfoil comprising a trailing edge, a first fluidic outlet, and a first controller. The trailing edge can have a first surface and a second surface opposing the first surface. The first fluidic outlet can be positioned on the first surface. The first controller can be configured to cause the first fluidic outlet to eject a fluid to alter an aerodynamic load experienced by the airfoil.

In any of the embodiments disclosed herein, the airfoil can further comprise a second fluidic outlet positioned on the first surface. The first fluidic outlet can be oriented such that fluid ejected from the first fluidic outlet exits the first fluidic outlet in a direction tangential to the first surface. The second fluidic outlet can be oriented such that fluid ejected from the second fluidic outlet exits the second fluidic outlet in a direction normal to the first surface. The first controller can be further configured to cause the second fluidic outlet to eject a fluid to alter an aerodynamic load experienced by the airfoil.

In any of the embodiments disclosed herein, the airfoil can further comprise a third fluidic outlet and a second controller. The third fluidic outlet can be positioned on the second surface. The second controller can be configured to cause the third fluidic outlet to eject a fluid to alter an aerodynamic load experienced by the airfoil.

In any of the embodiments disclosed herein, the airfoil can further comprise a fourth fluidic outlet positioned on the second surface. The third fluidic outlet can be oriented such that fluid ejected from the third fluidic outlet exits the third fluidic outlet in a direction tangential to the second surface. The fourth fluidic outlet can be oriented such that fluid ejected from the fourth fluidic outlet exits the fourth fluidic outlet in a direction normal to the second surface. The second controller can be further configured to cause the fourth fluidic outlet to eject a fluid to alter an aerodynamic load experienced by the airfoil.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

FIG. 8A, FIG. 8B, FIG. 8C, FIG. 8D, FIG. 8E, and FIG. 8F provide the temporal variations of the aerodynamic load increments to top-hat actuation waveform that switches from tangential to normal to tangential (T-N-T) actuation on each of the PS (FIG. 8A, FIG. 8B, and FIG. 8C) and SS (FIG. 8D, FIG. 8E, and FIG. 8F) in the absence and presence of continuous tangential actuation on the opposite side (at □=4o): ΔCL, (FIG. 8A & FIG. 8D) ΔCM, (FIG. 8B & FIG. 8E) and ΔCD (FIG. 8C & FIG. 8F) for PS (left) and SS (right) actuators, in accordance with an embodiment of the disclosure.

FIG. 10A, FIG. 10B, FIG. 10C, FIG. 10D, FIG. 10E, and FIG. 10F provide time-dependent response of the incremental lift (FIG. 10A & FIG. 10D) moment (FIG. 10B & FIG. 10E) and drag (FIG. 10C & FIG. 10F) coefficients to coupled alternating top-hat PS-SS actuation at □=4o for actuation frequencies of 4 Hz (FIG. 10A, FIG. 10B, and FIG. 10C) and 8 Hz (FIG. 10D, FIG. 10E, and FIG. 10F), in accordance with an embodiment of the disclosure.

DETAILED DESCRIPTION

To facilitate an understanding of the principles and features of the present invention, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Recent investigations by the inventors have demonstrated that bi-directional manipulation of the aerodynamic loads can be realized by using steady actuation jets issuing (nominally) normal to the suction and pressure surfaces upstream of the trailing edge at only a fraction of the drag penalty in conventional systems. Embodiments of the present disclosure builds on these findings and describe the use of temporal, bi-directional, pulsed fluidic actuation for transitory control of the aerodynamic loads using individually-controlled fluidically-switched jets integrated into the suction surface (SS) and opposing pressure surface (PS) near the trailing edge. For example, some embodiments of the present disclosure provide a novel pulsed fluidic actuator powered by pressurized air and can be integrated into an airfoil's trailing edge. The actuator system can comprise of a pair of identical air jets which are integrated into the pressure and suction surfaces of the trailing edge of the airfoil. Each air jet can have three outputs that can be switched fluidically. The output of the air jets on the suction and pressure surfaces of the airfoil can be individually addressable via computer generated trigger signals while the strength of each jet can be independently and continuously varied by regulating the pressure of the supplied air. Operating the air jet on both surfaces in conjunction with each other can enable the time-dependent, bi-directional control of the aerodynamic loads even in fully attached flow. Moreover, some embodiments of the present disclosure provide airfoils that do not comprise a conventional mechanical pivoting flap but still allow for the control of the aerodynamic loads experienced by the airfoil.

Figure 1:
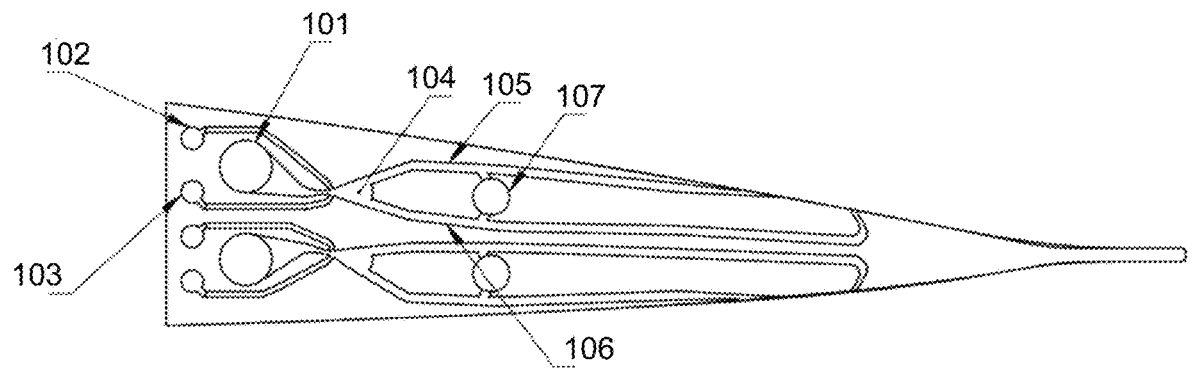
FIG. 1 provides a cross-sectional view of a schematic of an airfoil, in accordance with an embodiment of the disclosure.

Some exemplary embodiments of the present disclosure will now be described, in particular with reference to figures. FIG. 1 depicts the cross-sectional view of the trailing edge of an airfoil and, in particular, exemplary internal passages of the novel actuator in the trailing edge. The actuator module shown in FIG. 1 comprises two sets of diverging 2D channels (also referred to herein as "fluid outlets" or "outlet jets") on the top and bottom portion of the airfoil (suction and pressure sides/surfaces, respectively). Though, FIG. 1 presents two sets of channels, the present disclosure is not so limited. Indeed, some embodiments of the present disclosure comprise a single set of channels. Further, though FIG. 1 shows two fluid outlets on the SS and PS surfaces, in some embodiments, only fluid outlet is present on the SS and/or PS surfaces, and in some embodiments more than 2 fluid outlets can be present on the SS and/or PS surfaces. Because SS and PS jets are similar in geometry (only slight variations in the angle of the channels to allow packaging inside a cambered airfoil profile) and are substantially identical in terms of basic components and functions, only the SS jet's design and operating mechanism are discussed here. As would be appreciated by those skilled in the art, the operation and configuration of PS jets corresponds to the operation and configuration of SS jets disclosed herein. It is further noted that each set of jets (PS and SS) can be independently controlled.

Pressurized air (or any fluid, in particular, a compressible fluid) can enter the SS jet via the fluid supply 101 (the direction of the air supply tubes can be normal to the page). SS jet can have two weaker control jets 102 and 103, which when merged and interacted with the supply jet in the mixing region/chamber 104 can divert the merged jet into either one of the two fluid outlets 105 and 106. For SS jet, outlet 105 is sometimes herein referred to as the "tangential" output and outlet 106 is sometimes referred to as the "normal" output. During the operation of the novel actuator, supply jets 101 can be constantly on, while only one of control jet 102 and 103 will be active at a time. For SS jet, when control jet 102 is active, the supply jet 101 can be diverted to "normal" output 106 and when control jet 103 is active, the supply jet 101 can be steered to "tangential" output 105. As used herein, "tangential," as used herein refers to the portion of the channel of the respective fluid outlet proximate the respective surface of the airfoil having a longitudinal axis forming an angle of between −10° and 20° relative to the chord line facing downstream of the flow, as shown in FIG. 1 (where fluid outlet 105 exits the airfoil surface). Similarly, "normal," as used herein refers to the portion of the channel of the respective fluid outlet proximate the respective surface of the airfoil having a longitudinal axis forming an angle of between 20° and 90° relative to the chord line facing upstream of the flow, as shown in FIG. 1 (wherein fluid outlet 106 exits the airfoil surface). The mechanism of an exemplary switching process via control jets 102 and 103 is explained below with reference to FIG. 2.

A third fluid output 107 can function as a bypass switch for the actuator, which when connected to either fluid outlets 105 or 106 can internally re-route the supply jet 101 through the tubes inside the airfoil body (out of the page) and vented from the airfoil's spanwise edges, instead of allowing the flow to exit through the airfoil surface via fluid outlets 105 and 106. This will represent an "off" output for the actuator. The bypass switch can be toggled between multiple positions/states providing fluid connections between the various jets/outlets. When the bypass switch 107 is connected to "tangential" output 105, the actuator can only switch between "off" and the "normal" outlet 106. Similarly, when the bypass switch 107 is connected to the "normal" outlet 106, the actuator can only switch between "off" and the "tangential" outlet 105. Lastly, when the bypass switch 107 is connected to both the "tangential" outlet 105 and the "normal" outlet 106, the actuator can be constantly "off," and when the bypass switch 107 is not connected, the actuator can switch between the "tangential" outlet 105 and the "normal" outlet 106.

Figure 2:
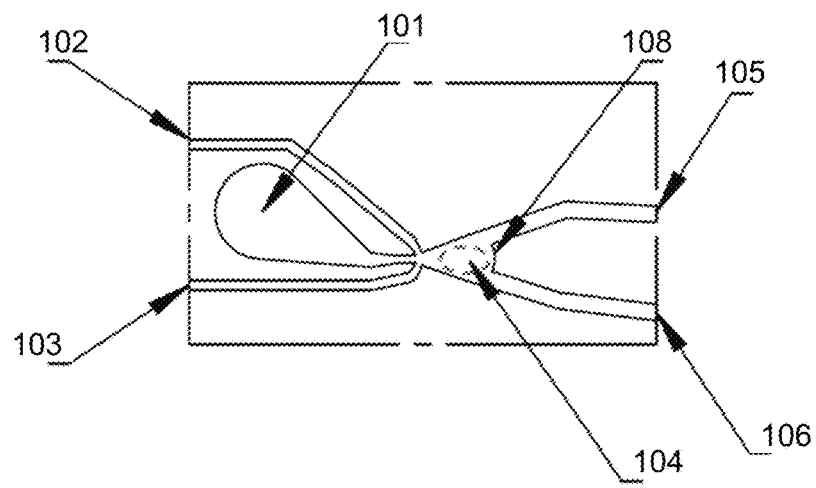
FIG. 2 provides a portion of a cross-sectional view of a schematic of an airfoil, in accordance with an embodiment of the disclosure.

FIG. 2 illustrates a close-up view of an exemplary fluidic switch used in an airfoil in some embodiments of the present disclosure for controlling the output of the supply jet 101. The bi-stable fluidic switch used in the SS and PS jets can comprise four basic parts—a supply jet 101, two control jets 102 and 103, two fluid outlets 105 and 106, and a mixing region/chamber 104 with a splitter 108 in the middle. The switch can draw pressurized air (from out of the page) via supply jet 101, and a relatively weak control jet 102 or 103 will enter the actuator from the left-hand side via a plenum that can be affixed to the actuator module. A computer programmable, miniature valve (including, but not limited to, a solenoid valve, which is not shown) can determine which port the control jet enters, which will in turn steer the high-speed main supply jet into the opposite output channel. The present disclosure, however, is not limited to a valve or, in particular, a solenoid valve; rather, embodiments of the present disclosure can include any means device or combination of devices capable of regulating the flow to the control jets or capable of generating a momentary flow from the control jets, including, but not limited to, acoustic chambers generating periodic flow through a nozzle, miniature combustion-powered actuating issuing millisecond scale pulsed jets, and the like. Turning on the control jet 102 can switch the supply jet 101 to the lower fluid outlet channel 106, and turning on the control jet 103 can switch the supply jet 101 to the upper fluid outlet channel 105. Because of the Coanda effect, this steering process can be self-stabilizing, where the circulation bubble formed in the mixing region/chamber 104 can be at higher pressure than the jet, which helps keep the jet attached to the channel walls. The angle between supply jet 101 and control jets 102 and 103 can be optimized to force the supply jet 101 to attach itself to the nozzle walls and ensure a smooth transition into the mixing region/chamber 104 without choking the supply jet 101 or bleeding into the opposite control channel. The location (distance from the merge point of the jets) and shape (radius of the round cut out) of the splitter 6 can be optimized such that the circulation bubble in the mixing region/chamber 104 can be formed so that the switching will be bi-stable, and that the switching is complete (nearly all of the flow is in one outlet channel 105 or 106).

Figure 3:
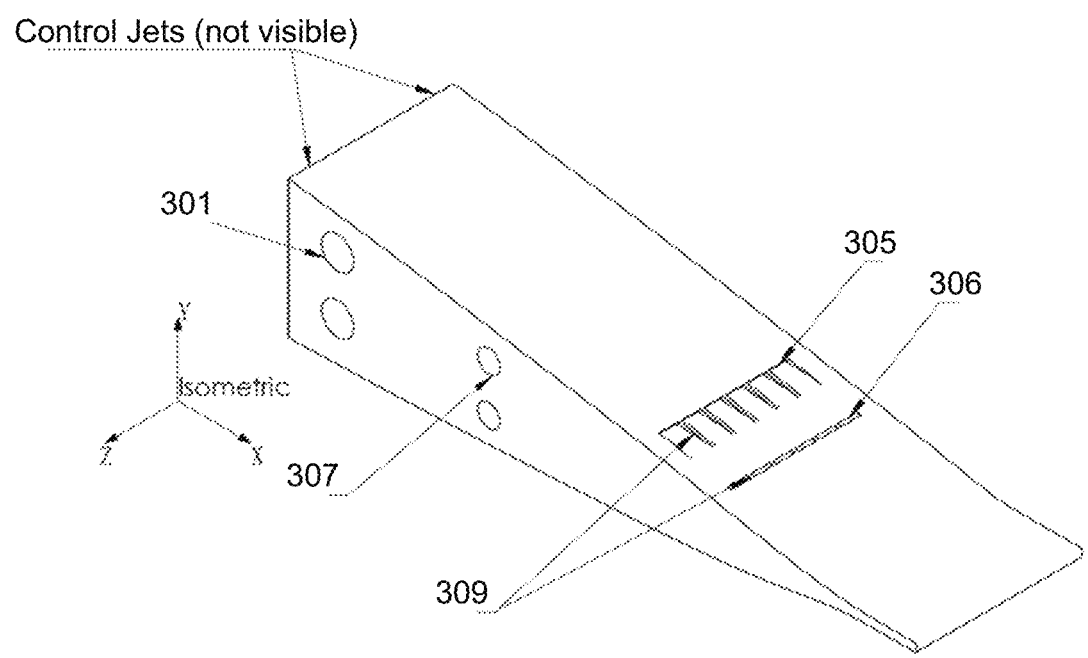
FIG. 3 provides a portion of a perspective view of a schematic of an airfoil, in accordance with an embodiment of the disclosure.

FIG. 3 depicts a perspective view of the external features of the actuator module integrated with the internal channels mentioned in FIG. 1. First, the 2D channels shown in FIG. 1 are extruded along Z axis (normal to page) to create 3D channels that can be scaled in the span-wise dimension. Chord-wise dimension can be scaled by simply scaling the 2D channel design in the X-Y plane. To ensure nominally 2D flow inside the 3D channel, vanes 309 can be placed inside the channels at fixed intervals (in an exemplary embodiment, the ratio of distance between vanes to the channel height~3.7). Through holes can be put into the vanes wherever flow in the Z axis direction is needed (supply port 301, bypass port 307 for SS and PS jet).

For simplicity, only SS jet is discussed in this section, since SS and PS jets are substantially identical, as discussed above. Supply jet enters the airfoil via supply port 302 on either spanwise edges of the actuator module. Control jet is sent to one of the two control ports 303 on the upstream-facing surface of the actuator module. The aforementioned "tangential", "normal" and "off" outputs are depicted in FIG. 3 as nozzles 305, 306, and 307, respectively. In the exemplary embodiment shown in FIG. 3, the "tangential" nozzle 305 is located at $x/c=0.85$ and nominally tangential to the local airfoil surface; the "normal" nozzle 306 is located at $x/c=0.88$ and inclined 60° upstream relative to the chord line; the "off" nozzle 307 is normal to the spanwise edges of the actuator module and diverts air along the Z axis. Preliminary wind tunnel experiments conducted on a static VR-12 airfoil have shown that steady actuating via the "normal" nozzle on PS/SS leads to profound bi-directional modification of the airfoil's trailing edge Kutta condition which leads to significant increments/decrements in lift and pitching moment, similar to the effects of trailing edge gurney flaps but at significantly lower drag penalties. Actuating via the "tangential" nozzle on PS/SS does not appreciably alter the aerodynamic performance on its own; instead, it can be used in conjunction with "normal" actuating on the opposite side to facilitate and amplify the modulation of Kutta condition.

Both SS and PS jets can have six operating states depending on the configuration of the bypass channel and the computer command trigger sent to the solenoid valve. These operating states can include three steady actuation states—Steady Off, Steady Normal, Steady Tangential, and three time-dependent actuation states—Pulsing Off↔H Normal, Pulsing Off↔Tangential, Pulsing Tangential↔Normal. The bypass channel configuration and trigger signal corresponding to each operating state for either SS and PS jets are tabulated in Table 1. Because SS and PS jets can be controlled independently, coupling of the various operating states of both jets can offer forty-one possible control modes, including coupled steady control, synchronous pulsed control, and alternating pulsed control. Potential control modes for the novel actuator are tabulated in Table 2.

TABLE 1

Possible operating state of each actuation jet

|  | Bypass Config. | Trigger State | Operating State |
|---|---|---|---|
| Steady Actuation | N.C. | Constant High | Normal |
|  | N.C. | Constant Low | Tangential |
|  | C. to Both | Any | Off |
| Time-dependent Actuation | C. to Tangential | Alternating | Off ↔ Normal |
|  | C. to Normal | Alternating | Off ↔ Tangential |
|  | N.C. | Alternating | Normal ↔ Tangential |

TABLE 2

Possible control combinations of coupled SS and PS actuation

| | SS Actuation Mode | PS Actuation Mode | Control Variable |
|---|---|---|---|
| Steady Control | Constant Off | Constant Off | N.A. |
|  | Constant Off | Constant Tangential | Jet strength |
|  | Constant Off | Constant Normal | ... |
|  | Constant Normal | Constant Off | ... |
|  | Constant Normal | Constant Tangential | ... |
|  | Constant Normal | Constant Normal | ... |
|  | Constant Tangential | Constant Off | ... |
|  | Constant Tangential | Constant Tangential | ... |
|  | Constant Tangential | Constant Normal | ... |
| Single-side Pulsing | Constant Off | Off ↔ Normal | Jet strength, frequency, duty cycle |
|  | Constant Off | Off ↔ Tangential | ... |
|  | Constant Off | Normal ↔ Tangential | ... |
|  | Constant Normal | Off ↔ Normal | ... |
|  | Constant Normal | Off ↔ Tangential | ... |
|  | Constant Normal | Normal ↔ Tangential | ... |
|  | Constant Tangential | Off ↔ Normal | ... |
|  | Constant Tangential | Off ↔ Tangential | ... |
|  | Constant Tangential | Normal ↔ Tangential | ... |
|  | Off ↔ Normal | Constant Off | ... |
|  | Off ↔ Tangential | Constant Off | ... |
|  | Normal ↔ Tangential | Constant Off | ... |
|  | Off ↔ Normal | Constant Normal | ... |
|  | Off ↔ Tangential | Constant Normal | ... |
|  | Normal ↔ Tangential | Constant Normal | ... |
|  | Off ↔ Normal | Constant Tangential | ... |
|  | Off ↔ Tangential | Constant Tangential | ... |
|  | Normal ↔ Tangential | Constant Tangential | ... |

TABLE 2-continued

Possible control combinations of coupled SS and PS actuation

| | SS Actuation Mode | PS Actuation Mode | Control Variable |
|---|---|---|---|
| Synchronous Pulsing | Off ↔ Normal | Off ↔ Normal | Frequency, duty cycle, phase delay |
| | Off ↔ Normal | Tangential ↔ Normal | . . . |
| | Off ↔ Tangential | Off ↔ Tangential | . . . |
| | Off ↔ Tangential | Normal ↔ Tangential | . . . |
| | Normal ↔ Tangential | Normal ↔ Tangential | . . . |
| | Normal ↔ Tangential | Off ↔ Tangential | . . . |
| | Tangential ↔ Normal | Off ↔ Normal | . . . |
| Alternating Pulsing | Off ↔ Normal | Off ↔ Tangential | Frequency, duty cycle, phase delay |
| | Off ↔ Normal | Normal ↔ Tangential | . . . |
| | Off ↔ Tangential | Off ↔ Normal | . . . |
| | Off ↔ Tangential | Tangential ↔ Normal | . . . |
| | Normal ↔ Tangential | Tangential ↔ Normal | . . . |
| | Normal ↔ Tangential | Off ↔ Normal | . . . |
| | Tangential ↔ Normal | Off ↔ Tangential | . . . |

Operation of the airfoil and fluidic actuators disclosed herein can be controlled by one or more controllers configured to control the fluid supplies, control jets, bypass switches, and other components disclosed herein. In some embodiments, a single controller can be used to control the various components. In some embodiments, multiple controllers can be used to control the various components. The controllers can be any controllers known in the art, including, but not limited to, central processing units, microcontrollers, remote computing devices, and the like. The controller(s) can comprise one or more processors and one or more memories. The one or more memories can comprise instructions that when executed by the one or more processors, can control the various components disclosed herein.

The fluid supplies and control jets can be configured to deliver fluids at a constant or variable fluid pressure. In some embodiments, for example, the control jets can be configured to deliver fluid using a pulse width modulated signal, in which the duty cycle of the control jets can be varied to alter the portion of the fluid from the fluid supply being ejected from the various outlets and bypass.

The following examples further illustrate aspects of the present disclosure. However, they are in no way a limitation of the teachings or disclosure of the present disclosure as set forth herein.

EXAMPLES

Figure 4A:
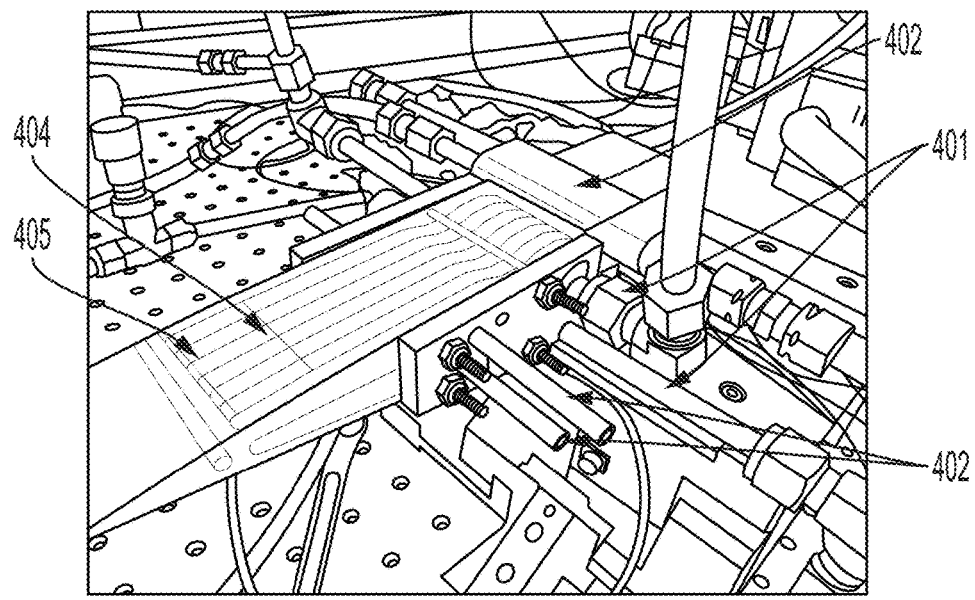
FIG. 4A provides a photograph of a prototype airfoil, in accordance with an embodiment of the disclosure.

A prototype of an embodiment of the present disclosure was fabricated using stereolithography and bench tested. FIG. 4A shows a photograph of the prototype with pressurized air supply tubes connected. Tubing connector 401 is the supply jet for SS and PS actuators. Plenum 402 houses the solenoid valve and distributes control jets to the appropriate control port for the SS and PS actuators. Tubing connector 403 is the bypass output for the actuators. Nozzles 404 and 405 are the tangential and normal outlets of the SS actuator, respectively. Outlet nozzles for the PS actuator is on the lower surface and not visible in the photo. The prototype actuator demonstrated bi-stable switching on both the SS and PS jets with switching frequency>35 Hz and exit jet velocity>100 m/s.

Figure 4B:
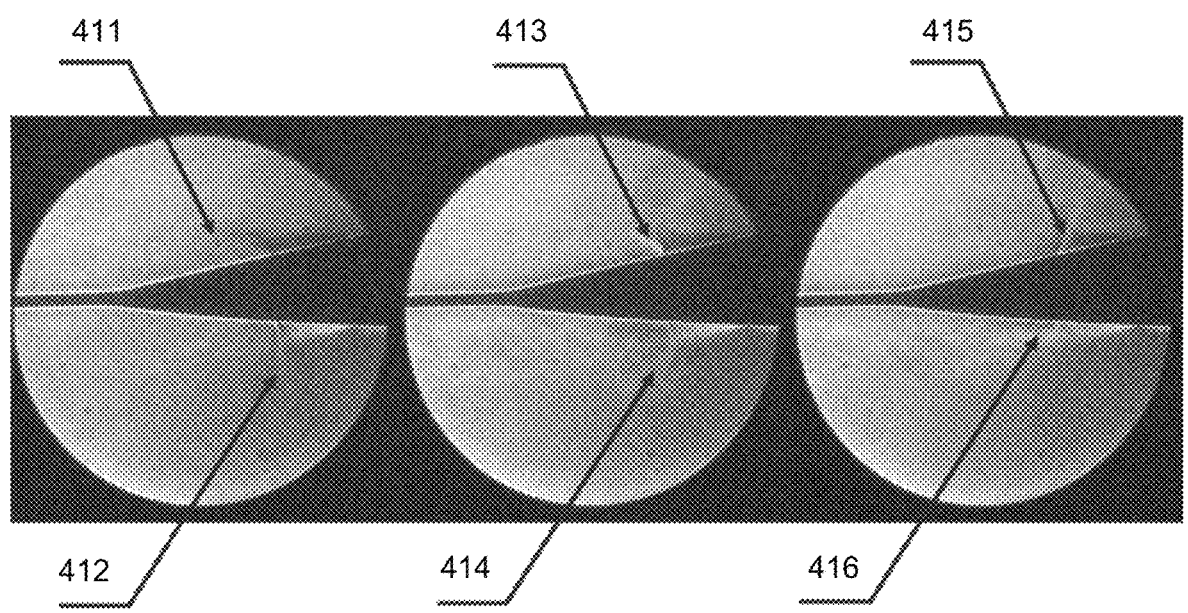
FIG. 4B provides a sequence of Schlieren images on the prototype of FIG. 4A operating at Alternating Pulsing mode.

A sequence of Schlieren images on the prototype operating at Alternating Pulsing mode were acquired at 2 KHz as a demonstration and the results are illustrated in FIG. 4B. In the left frame (t=0 ms), SS outlet jet is at Tangential output state with output flow 411 nominally tangential and attached to the local airfoil surface. In the meantime, PS jet is at normal output state where a coherent jet structure 412 can be seen ejecting at approximately 60° relative to the chord line. In the meantime, trigger signals are sent to the solenoid valves commanding both the SS and PS jets to switch outputs. In the center frame (t=1.5 ms) both SS outlet jet 413 and PS outlet jet 414 can be seen transitioning to their respective opposite outputs. In the right frame (t=3 ms), both jets have completed their transition to the opposite outputs. SS outlet jet 415 is now at its normal output position at 60° relative to the chord line while PS outlet jet 416 is at its tangential output state attaching to the airfoil surface.

EXPERIMENTAL VALIDATION

The performance of an embodiment of the present disclosure when implemented in a 3D airfoil was evaluated in an open-return wind tunnel at Georgia Tech. Aerodynamic force measurement and particle image velocimetry data obtained in these experiments showed significant transitory control authority in both increasing and decreasing the aerodynamic loads on a VR-12 airfoil integrated with the full-scale actuator prototype across a wide range of angles of attack.

Experimental Setup

Figure 5A:
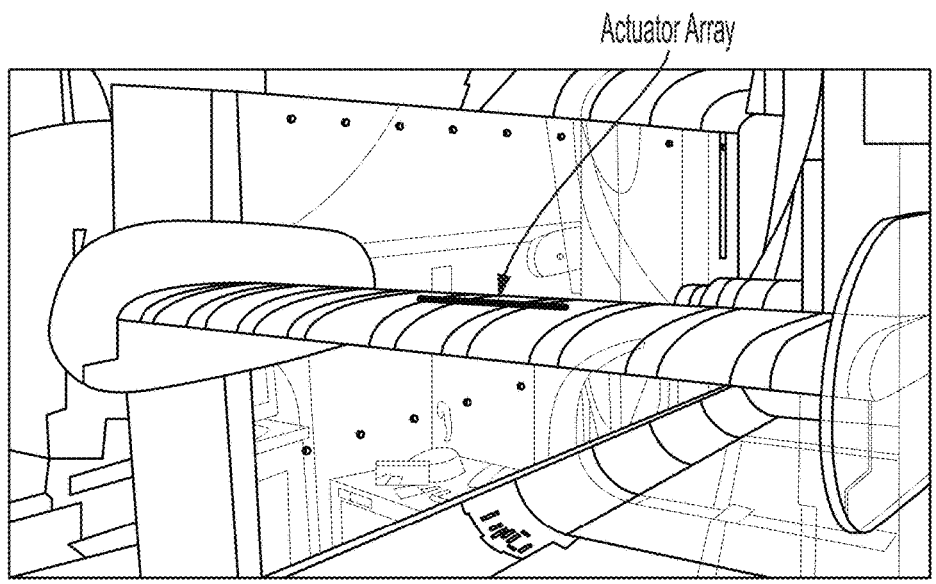
FIG. 5A provides VR-12 airfoil model in wind tunnel, FIG. 5B provides cross-sectional view of airfoil trailing edge with switching jets, and FIG. 5C provides location of PIV windows, all in accordance with an embodiment of the disclosure.

The modular VR-12 airfoil (chord c=381 mm with 0.05 c trailing edge tab) was constructed from 2-D interconnected sections of aluminum shells that are supported by an internal spar. The model which is equipped with spanwise endplates spans the full width of the test section (910 mm) and is mounted on the wind tunnel walls (FIG. 5A) using a pair of high-resolution 6-component load cells that yield time-resolved global lift, drag, and pitching moment. The measured loads are corrected for inertia effects associated with rotational and translational vibration of the model which are assessed using embedded accelerometers. The present investigations are conducted at $U_\infty$=20 m/s, Rec=535,000.

Figure 5B:
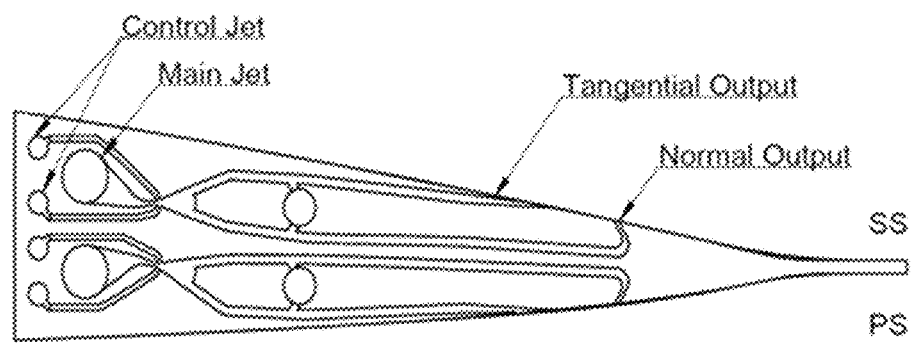

Actuation is provided by spanwise array of five novel actuator modules each including a pair of independently-controlled pressure and suction side fluidically-switched pulsing jets near the trailing edge of the airfoil as depicted in FIG. 5B. The entire actuation assembly is located within the domain $0.39 \leq z/s \leq 0.61$ and $0.55 \leq x/c \leq 1$. This design utilizes a fluidic mechanism that is similar to a bi-stable, Coanda wall-attachment fluidic amplifier within an internal diverging nozzle. A steady primary jet interacts with two alternating diverting control jets (each 0.05-0.1 of the flow rate of the primary jet) within the nozzle that leads to two outlets corresponding to either (nominally) tangential or normal (60° relative to chord) actuating over the airfoil's surface. The effects of steady normal jets were investigated. Below, the mass flow rates for continuous actuation (or max instantaneous strength for pulsed actuation) on both sides are fixed at 500 slpm yielding an exit speed of approximately 72 m/s ($C_q$~0.84% and $C_\mu$~3.03% at $U_\infty$=20 m/s).

Figure 5C:
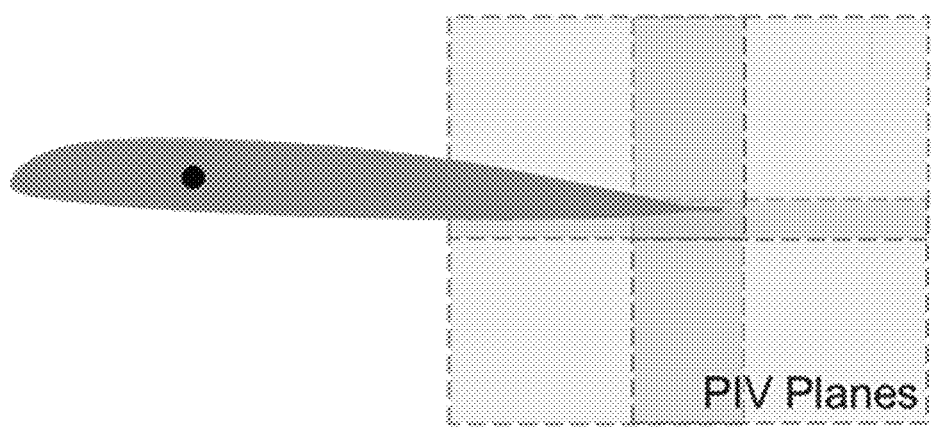

The flow field over the suction surface upstream of the trailing edge and in the near-wake is measured in a cross-stream plane that intersects an actuator orifice using particle planar image velocimetry (PIV) using two simultaneous, partially-overlapping views and images of the time-averaged flow fields are subsequently combined to form a single view (FIG. 5C). The same process is repeated for the pressure surface, and the two combined PIV measurements enable a view of the flow field around the entire trailing edge.

Timing Characterization of the Switched Fluidic Actuator

Figure 6A:
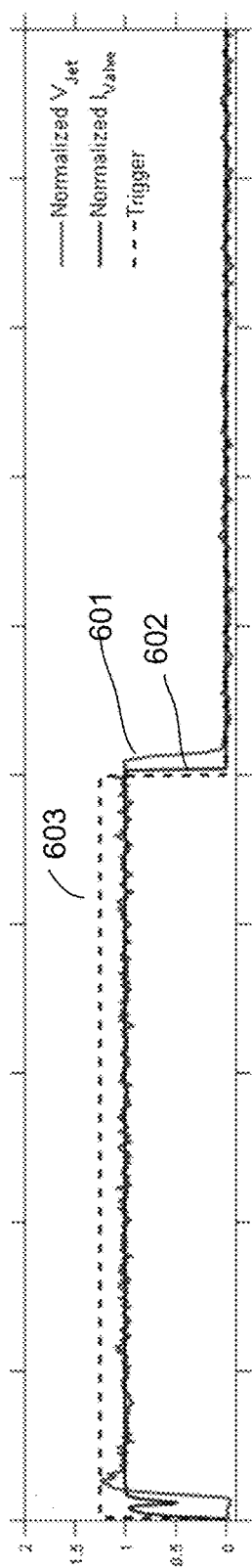
FIG. 6A, FIG. 6B, and FIG. 6C provide normalized jet velocity measured at the normal output overlaid with solenoid current and trigger signal for SS actuating jet operating at (FIG. 6A) 2 Hz (FIG. 6B) 5 Hz and (FIG. 6C) 10 Hz, in accordance with an embodiment of the disclosure.
Figure 6B:
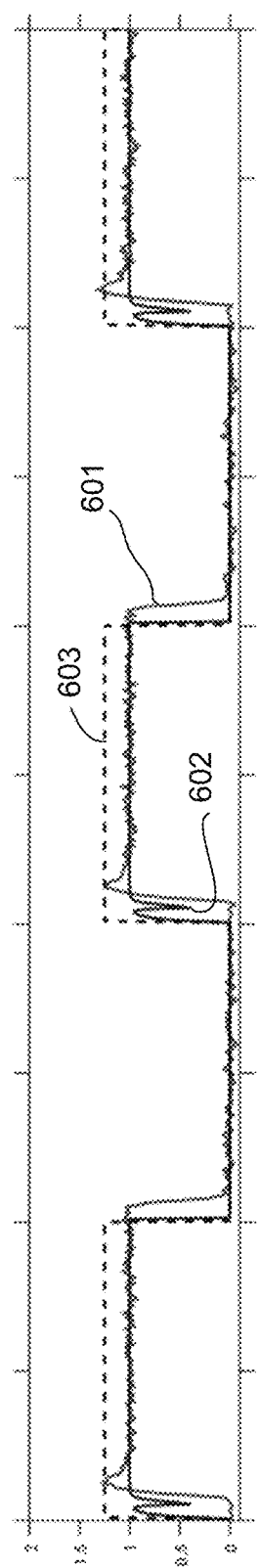
Figure 6C:
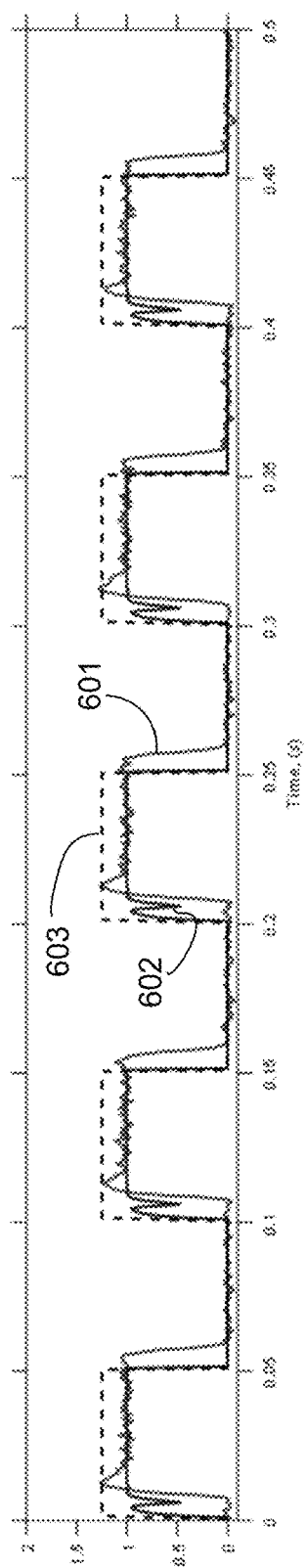

Switched bi-stable fluidic output was characterized during bench tests which demonstrated that the novel fluidic actuator can yield an instantaneous momentum coefficient of up to $C_\mu$=3.03% (based on $U_\infty$=20 m/s) at switching frequency exceeding 30 Hz. The characteristic timing of switching of the normal jet was measured using hot-wire anemometry near the normal exhaust ports while simultaneously recording the current drawn by the miniature solenoid valve on the control jets. FIGS. 6A-C shows the normalized jet velocity (601) when the control jet is operated using a square wave (50% duty cycle) at 2, 5, and 10 Hz, respectively, overlaid with the normalized solenoid actuation current (602) along with the trigger signal (603). The current traces show that the delay associated with the valve movement (which is characterized by a local current minimum) is about 6 ms. These traces also show that the onset time of the full-speed jet is approximately 3 ms while its relaxation time following the termination of the actuation is approximately 4 ms. The results in FIGS. 6A-C show that the delay associated with the valve movements and fluidic switching (onset and relaxation times) are frequency-independent. These attributes make this fluidic actuator an attractive alternative to mechanical control surfaces whose response time are limited by their weight and the power of the electro-mechanical system.

In common with other pulse-based fluidic actuators, trailing edge pulsed fluidics can be activated on demand, and the timing between individual pulses can be adjusted to suit a range of flow conditions and maximize actuation efficiency. For example, prior investigations (e.g., COMPACT) demonstrated that as few as three discrete actuation pulses during the time-periodic pitch cycle of a VR-12 airfoil can significantly accelerate flow reattachment post dynamic stall and improve damping stability. However, unlike COMPACT, the pulse width of the trailing edge switching jet can be easily varied along with the duty cycle of the actuation.

Time Averaged Aerodynamic Performance

Figure 7A:
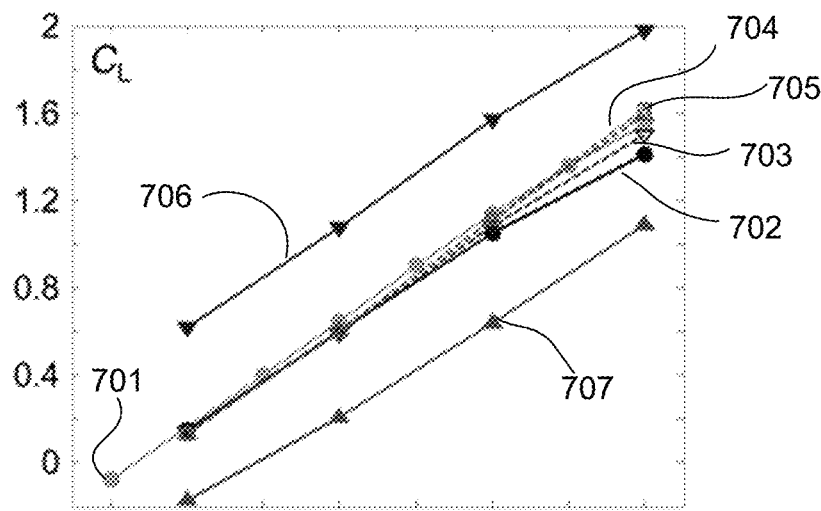
FIG. 7A, FIG. 7B, and FIG. 7C provide variations with α in lift (FIG. 7A) pitching moment (FIG. 7B) and drag (FIG. 7C) for the base airfoil in the absence and presence of the actuator module, and with time-invariant tangential and normal actuation on each of the pressure and suction surfaces, and on both surfaces, in accordance with an embodiment of the disclosure.
Figure 7B:
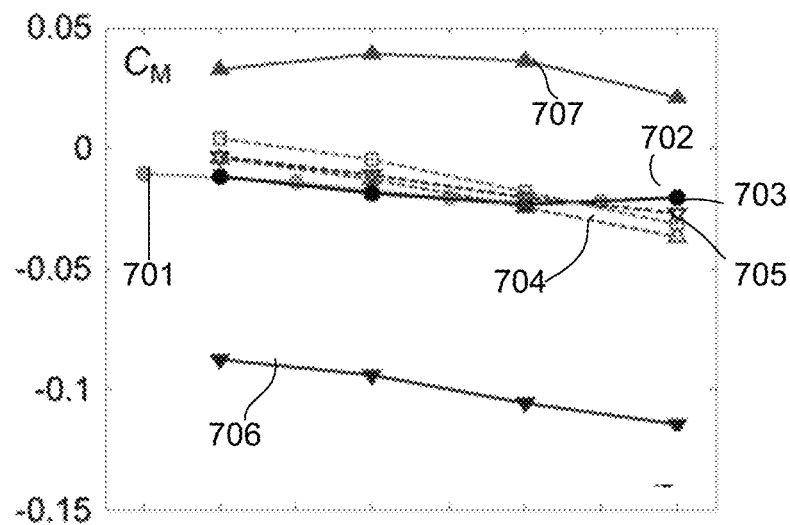
Figure 7C:
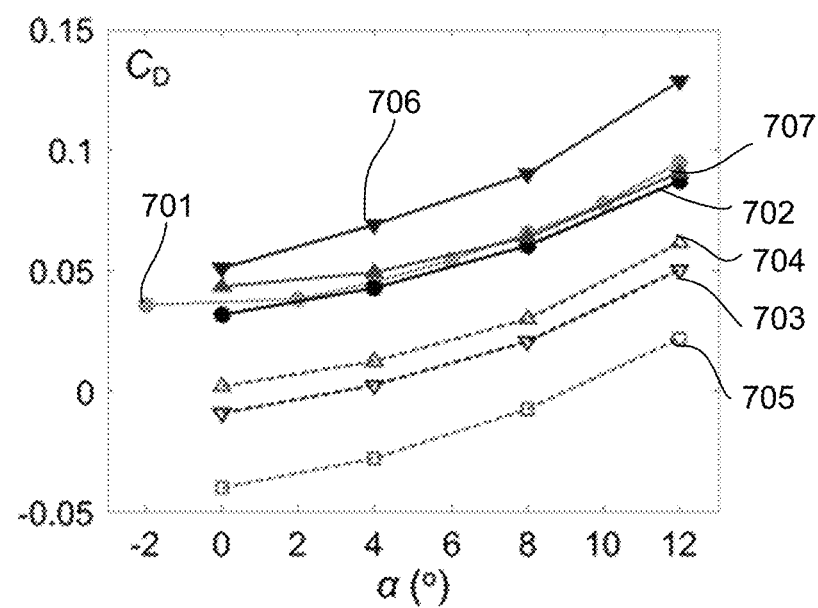

The variations of the global lift, pitching moment, and drag with angles of attack over the range $-2°\leq\alpha\leq12°$ in the absence and presence of time-invariant normal and tangential actuation are shown in FIGS. 7A-C, respectively. The corresponding data for the baseline model in the absence (na) and presence (pa) of the actuation module are also shown for reference and indicate that the presence of the module hardly changes the baseline pitching moment and drag. While the lift of the actuator-integrated airfoil agrees well with (na) baseline airfoil at low angles of attack, it begins to diverge somewhat for $\alpha>10°$ (e.g., a decrement of $\Delta C_L$=−0.13 at $\alpha$=12° indicating the effects of the actuation orifices (ostensibly the formation of localized separation bubbles). As noted below, this slight decrease in lift can be recovered by tangential actuating.

The aerodynamic effects of steady tangential/normal actuation on each of the pressure and suction sides and on both sides are presented in FIGS. 7A-C. In FIGS. 7A-C, variations with $\alpha$ in lift (FIG. 7A) pitching moment (FIG. 7B) and drag (FIG. 7C) for the base airfoil in the absence (701) and presence (702) of the actuator module, and with time-invariant tangential actuation on each of the pressure (703) and suction (704) surfaces, and on both (705) surfaces and time-invariant normal actuation on each of the pressure (706) and suction (707) surfaces. As shown in FIG. 7A, tangential actuation on either the PS or SS does not affect the lift at low angles of attack, while at moderate angles of attack ($\alpha>8°$) PS or SS tangential actuation increases $C_L$ by nearly 6% and 12% relative to the (na) baseline at $\alpha$=12°, respectively, indicating that the slight reduction in lift owing to the presence of the actuation module can be recovered in the presence of tangential actuation. The slightly stronger lift recovery by SS actuation indicates higher effectiveness in mitigating the adverse pressure gradient. Furthermore, PS and SS actuation yields additional increase in lift of 14% relative to the (na) baseline at $\alpha$=12°. Perhaps more importantly, normal actuation on either PS or SS yields significant respective lift increments or decrements of up to $\Delta C_L$=+0.52 or −0.41 that are nearly invariant with $\alpha$, and can be easily regulated by changing $C_\mu$. These increments or decrements are comparable to the effects of a 0.2 c flap deflected at angles of up to 4° which was deemed sufficient for on-blade vibration control.

The effects of steady actuation on the pitching moment are summarized in FIG. 7B. Tangential actuation on the PS at low and moderate $\alpha$ leads to a slight decrease (+0.007) and increase (−0.006) in nose-up (negative) $C_M$. Actuation on the suction side results in similar but somewhat stronger response in that the monotonical decrease in $C_M$ with $\alpha$ indicates suppression of moment stall resulting in an increase of nose-up pitching moment of −0.016 at $\alpha$=12°. Simultaneous tangential actuation on both surfaces generally follows the same pattern as SS actuation but at a lower $C_M$ owing to the cancellation of PS/SS actuation effects. Independent normal PS and SS actuation engenders significant respective increments and decrements in nose-up $C_M$ (up to $\Delta C_M$=−0.08 and +0.06). The data in FIG. 7B indicate that while the effect of PS actuation on $C_M$ increases with $\alpha$, SS actuation is most effective at $4°<\alpha<8°$. The effects of the actuation on the drag are shown in FIG. 7C. As expected, these data indicate that tangential actuation on either PS or SS or on both contributes to significant reductions in drag compared to the (na) baseline ($\Delta C_D$ of up to −0.03, −0.04, and −0.07, respectively). It is noteworthy that these decrements are mostly invariant with $\alpha$, and are about 25% higher than the thrust of the actuation jets as measured in quiescent conditions, indicating that a fraction of drag performance comes from aerodynamic interactions with the free stream ostensibly owing to changes in entrainment in the presence of the cross flow. As anticipated, normal actuation leads to an increase in drag relative to the (na) baseline owing to blockage by the jets and the changes associated with increase or decrease in lift-induced drag. As a result, the drag increment associated with PS actuation is higher than with SS actuation and is highest at α=12° (up to $\Delta C_D$=+0.04 and +0.01, respectively).

Bi-Directional Modifications of the Aerodynamic Loads Using Pulsed Actuation

Figure 11A:
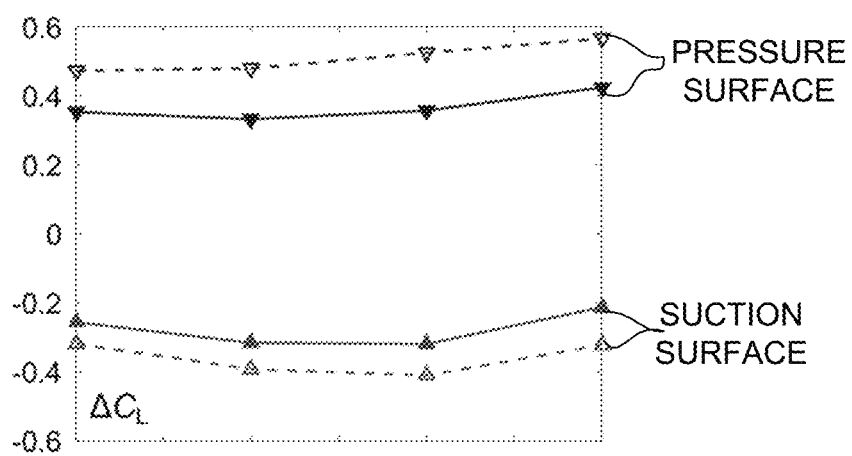
FIG. 11A, FIG. 11B, and FIG. 11C provide variations with α of the lift (FIG. 11A), moment (FIG. 11B), and drag (FIG. 11C) increments for independent (dashed) and coupled (solid) PS and SS actuation, in accordance with an embodiment of the disclosure.
Figure 11B:
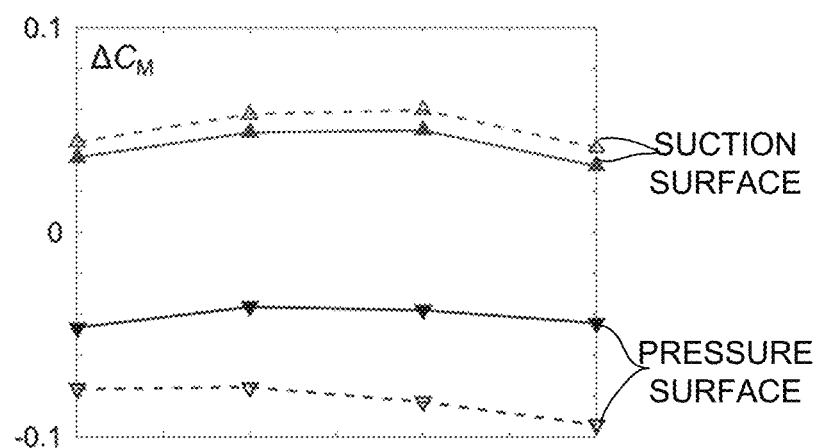
Figure 11C:
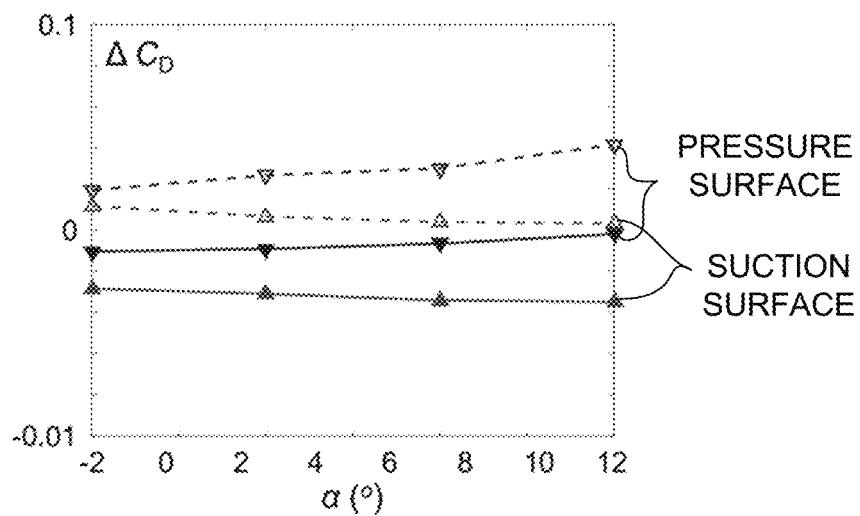

The control authority of isolated and coupled PS and SS pulsed fluidic actuation near the trailing edge of the airfoil is investigated over a range of angles of attack 0°≤α≤12° by varying the actuation waveform (frequency and duty cycle) and sequencing. Because the temporal characteristics of the response to the actuation are relatively insensitive to the angle of attack, these effects are discussed for measurements that are obtained phase-locked to the actuation waveform at α=4° ($Re_c$=535,000) in FIGS. 8-10, while the overall trend in control authority over the entire range of α is illustrated in FIG. 11.

The transitory aerodynamic responses in terms of the load increments ($\Delta C_L$, $\Delta C_M$, and $\Delta C_D$) are investigated using a top-hat actuation waveform which switches from tangential to normal to tangential (T-N-T) actuation on the PS and SS in the absence and presence of continuous tangential actuation on the opposite side are shown in FIG. 8. FIG. 8A-C show the load increments acquired phase-locked to the actuation waveform for PS actuation (where $t_{T\text{-}N}$=12.5 $T_{conv}$ and $t_{N\text{-}T}$=37.5 $T_{conv}$) in the absence of SS tangential actuation. These data show that the lift curve closely follows a step response where at the start of the actuation cycle the sectional lift coefficient is identical to the unactuated baseline and a sharp rise immediately following the onset of PS switching which asymptotes to $\Delta C_L$=+0.48 in approximately 6.3 $T_{conv}$ and is sustained until the actuation is terminated and the lift relaxes to baseline level within approximately 7 $T_{conv}$. The moment response to the actuation in FIG. 5B (nose-up pitching moment increment $\Delta C_M$=-0.08) is similar to the response of the lift although the response times are shorter (4.2 $T_{conv}$ and 1.7 $T_{conv}$ for onset and relaxation, respectively). Initially, the drag starts at lower levels than baseline (-0.04) due to tangential actuation and increases to slightly above baseline following the onset of the normal actuation (+0.03). The oscillations in the measured drag result from vibrations of the model following the impulsive changes in the loadings. While the lift and moment are corrected by measurements of the vibrations using built-in accelerometers, such accelerometers were not installed along the drag axis and therefore the inertia effects are not accounted for. FIGS. 8D-F show that the response to the same actuation waveform on the SS in the absence of PS tangential actuation ($t_{T\text{-}N}$=37.5 $T_{conv}$ and $t_{N\text{-}T}$=62.5 $T_{conv}$) is nearly identical but opposite to the PS actuation.

The response to the same actuation waveform in the presence of continuous opposite-side tangential actuation is largely unchanged. For both PS and SS, the presence of tangential actuation on the opposite side leads to a reduction in the asymptotic lift and moment increments or decrements but the timing is not affected. These reductions amount to 30%/50% in the magnitudes of the asymptotic $\Delta C_L$ and $\Delta C_M$ for PS actuation and 18%/15% for SS actuation. More importantly, with the addition of tangential actuation on the opposite side the drag compared to unactuated baseline is decreased for the entire cycle (up to -0.03), even when the lift is significantly higher than the baseline. This yields better efficiency than mechanical control surfaces by reducing the lift-induced drag. Similar to the effect of tangential actuation on the SS above, comparison of FIGS. 8A-C to FIGS. 8D-F shows that SS switching actuation is less sensitive to the presence of tangential actuating on the PS.

Figures 9A, 9D:
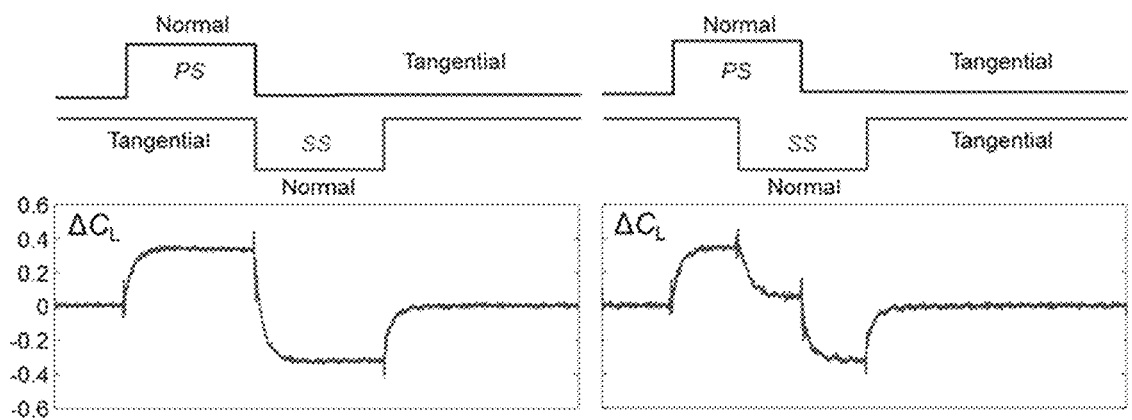
FIG. 9A, FIG. 9B, FIG. 9C, FIG. 9D, FIG. 9E, and FIG. 9F provide the temporal variations of the aerodynamic load increments to sequential non-overlapping (FIG. 9A, FIG. 9B, and FIG. 9C) and partially (50%) overlapping (FIG. 9D, FIG. 9E, and FIG. 9F) top-hat actuation waveforms on the PS and SS (at □=4o): ΔCL, (FIG. 9A & FIG. 9D) ΔCM, (FIG. 9B & FIG. 9E) and ΔCD (FIG. 9C & FIG. 9F), in accordance with an embodiment of the disclosure.
Figures 9B, 9E:
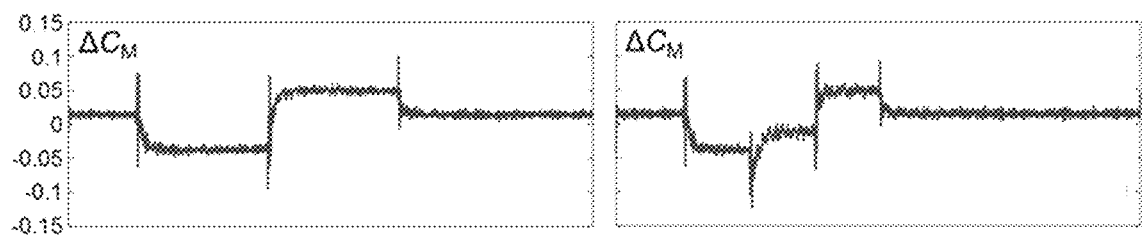
Figures 9C, 9F:
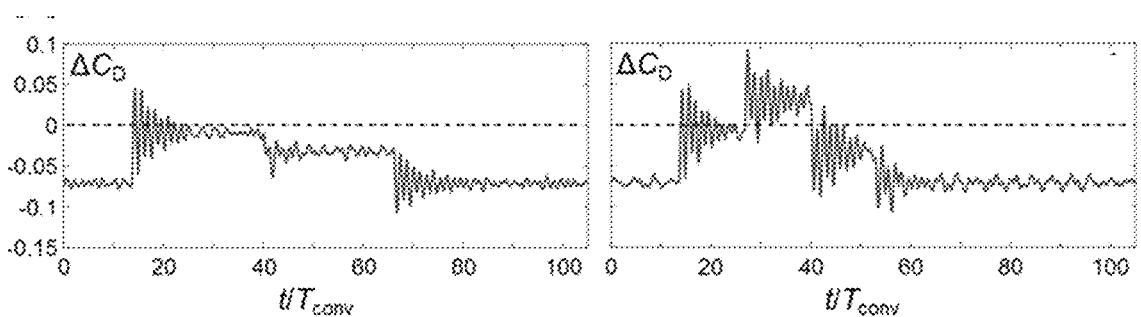

Bi-directional control authority of the pulsed fluidic actuator in terms of $\Delta C_L$, $\Delta C_M$, and $\Delta C_D$ is demonstrated using alternating, identical top-hat T-N-T SS-PS actuation waveforms (each similar to the waveforms used in connection with FIG. 8) as demonstrated schematically in FIG. 9 (the repetition rate of the actuation is 1 Hz). In FIGS. 9A-C, the top-hat actuation waveforms are sequential, while, in FIGS. 9D-E, they overlap by 50%. The lift response to the actuation is shown in FIG. 9A, where during the start of the cycle (0<t/$T_{conv}$<12.5) both jets are tangential, and the sectional lift coefficient is identical to the baseline lift. Between 12.5<t/$T_{conv}$<37.5, the PS actuation is impulsively switched to normal (SS actuation remains tangential), followed immediately by SS normal actuation and PS actuation switching to tangential (37.5<t/$T_{conv}$<62.5). A sharp increase in lift is observed following the onset of PS normal actuation at t/$T_{conv}$=12.5 which asymptotes to $\Delta C_L$=+0.34 in approximately 6.3 $T_{conv}$ and is sustained. When actuation is switched from PS to SS at t/$T_{conv}$=37.5, the lift rapidly decreases from +0.34 to -0.33 in the span of 7 $T_{conv}$. At last, both actuators return to tangential output for the remainder of the cycle (62.5<t/$T_{conv}$<100) and the lift relaxes to baseline levels (i.e., $\Delta C_L$=0) where the characteristic relaxation time is approximately 7 $T_{conv}$. The moment coefficient (FIG. 9B) exhibits rapid transients similar to the lift, where the decrease in $C_M$ is up to -0.04 following the onset of PS normal actuation, followed by a sharp increase to +0.05 above the unactuated baseline. It is noted that the moment response to actuation is faster than that of the lift (the characteristic onset and relaxation times are 4.2 $T_{conv}$ and 1.7 $T_{conv}$, respectively). While the drag coefficient increases with PS actuation and is slightly reduced when switching to SS actuation, it is noteworthy that drag is at lower levels than the unactuated baseline airfoil throughout the entire cycle even during PS actuation when the lift coefficient is significantly higher than the baseline lift (thus more lift-induced drag). This suggests that the tangential actuation from the opposite side of the active actuator helps mitigate the drag penalty incurred by actuating in the normal direction. Furthermore, when comparing the responses between FIGS. 9 and 8, it is evident that coupling actuation pulses on both the PS and SS does not alter the transient response of the flow to actuation pulses from either side indicating the potential for a broad range of actuation sequences.

The combined effects of simultaneous PS and SS actuation when the top-hate actuation waveforms are partially overlapped (50%) are shown in FIGS. 9D-F. Comparison of the lift response in FIGS. 9D and 9A shows no appreciable effects on the initial transient increase in lift at t/$T_{conv}$=12.5 or the final relaxation at t/$T_{conv}$=62.5 and the corresponding asymptotic levels are also unchanged. However, it is noted that during the overlap, the lift increment decreases from +0.33 to +0.07 within 7 $T_{conv}$. The reason that intermediate lift does not vanish is attributed to the different directions of the actuation jets and the different pressure gradients on the SS and PS. Similarly, there is an additional increase in the nose-up pitching moment (from -0.04 to -0.08) immediately following the onset of overlap which then decays to an intermediate steady state level of -0.01 (FIG. 6e). Similar trend is observed for the drag in FIG. 9F where drag during the overlap is the highest for the cycle (+0.03).

The effects of actuation at higher repetition rates are shown in FIG. 10 with no overlap between PS and SS normal actuation. In FIGS. 10A-C, the repetition rate of the top-hat waveform of FIG. 9 increases from 1 Hz to 4 Hz using four sequential pulses. The resulting transient lift response is nearly identical to FIG. 9 and the maximum and minimum lift change achieved is +0.33/−0.32. It is worth noting that the width of each actuation pulse is just slightly larger than the characteristic onset transient time and the lift can reach its maximum or minimum asymptotic levels. Identical trends are also observed for pitching moment and drag coefficients. Next, in FIGS. 10D-Figures, the actuation frequency is further increased to 8 Hz and the number of pules is increased to 8. In this case, actuation period $T_{act}$=3.2 $T_{conv}$<7.5 $T_{conv}$ needed for the lift to reach it asymptotic level (e.g., FIG. 9A). As a result, the transient increase or decrease in lift is interrupted by the subsequent actuation pulses and the asymptotic lift levels are not reached. The maximum/minimum $\Delta C_L$ reached by 8 Hz actuation diminish to +0.29 and −0.21, respectively. Because pitching moment responds faster than lift to impulsive actuation input, the nose-up pitching moment in FIG. 10E can still reach its asymptotic levels as in FIG. 9B. The drag coefficient also remains largely unchanged except for some increased in the oscillations due to the increase in the excitation frequency by the aerodynamic loading.

The variation with a of the control authority of non-overlapping, bi-directional (PS and SS) top-hat actuation waveforms where the repetition period is longer than the characteristic rise and fall times of the aerodynamic loads is summarized in FIG. 11. Individually actuated PS and SS (with the opposite side actuator inactive) that provide uni-directional modulation of the aerodynamic loads as mentioned in § III yield maximum control authority at β=8° with $\Delta C_L$=+0.52 and −0.41 and $\Delta C_M$=−0.08 and +0.06. These data indicate that the flow is more receptive to PS than to SS actuation although the variation with α is relatively small. Drag responses under independent PS and SS actuation are similar at α=0° but diverges as a increases. The drag increments for PS actuation range from $\Delta C_D$=+0.02 to +0.04 (at α=0° and 12°, respectively) while the corresponding increments for SS actuation decrease from $\Delta C_D$=+0.01 to +0.003 (at α=0° and 12°, respectively).

Variation with a of the control authority of bi-directional, coupled PS and SS actuation using maximum or minimum load increments is also shown in in FIG. 11. These data show that coupled control results in slight diminution of the maximum and minimum increments or decrements in lift and pitching moment compared to the levels achieved by independent actuation due to the effects of tangential actuation on the opposite side. The lift and moment distributions follow the same general trends, and SS actuation appears to be less sensitive to tangential actuating from the PS. The offset in control authority is invariant with α, with the exception of the $C_M$ response on the PS where the offset increases with a. Overall, the maximum levels with coupled PS and SS actuation are attained at α=8° for $\Delta C_L$=+0.36 and −0.32 and $\Delta C_M$=−0.04 and +0.05. It is important to note that these load increments are comparable to those produced by mechanical flaps for on-blade vibration control in earlier investigations. However, using coupled PS and SS trailing edge pulsed fluidics yields a reduction in drag over the entire present range of angles of attack (up to −0.03 at α=12°) when compared to unactuated baseline.

Trailing Edge Flow Topology During Bi-Directional Fluidic Actuation

The flow transients associated with coupled PS-SS sequential top-hat actuation (cf., FIGS. 9A-C) are investigated using planar PIV measurements (above) that are obtained phase-locked to the actuation waveform. The present PIV measurements were designed to capture three transients during the switching actuation: i. PS tangential to normal with the SS tangential; ii. PS normal to tangential and SS tangential to normal; and iii. PS tangential and SS normal to tangential. The temporal resolution of the PIV measurements is 0.02 s (1.05 $T_{conv}$) and flow images are captured through 9.4 $T_{conv}$, following the actuation trigger (as shown herein, the characteristic onset/relaxation time is approximately 7 $T_{conv}$). FIG. 12 shows color raster plots of spanwise vorticity concentrations overlaid with velocity vectors captured during several phases of the three transients (each in a separate column, and each of the rows is acquired at the same delay relative to the actuation trigger).

Figure 12A:
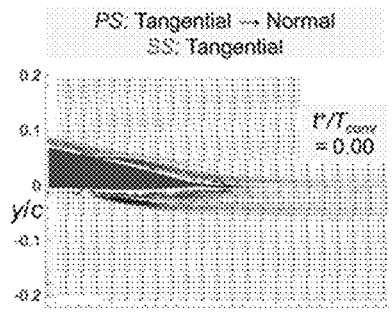
FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L provide raster plots of phase-averaged CW and CCW concentrations of spanwise vorticity superimposed with velocity vectors within the airfoil's trailing edge domain showing transitory changes in lift: increase (FIG. 12A, FIG. 12B, FIG. 12C, and FIG. 12D), decrease (FIG. 12E, FIG. 12F, FIG. 12G, and FIG. 12H) and relaxation (FIG. 12I, FIG. 12J, FIG. 12K, and FIG. 12L) in response to top-hat sequentially-coupled PS-SS fluidic actuation, in accordance with an embodiment of the disclosure. Legends above each column denote the corresponding actuation switching command. The PIV images are acquired at fixed delay relative to the actuation trigger at t+/Tconv=0 (FIG. 12A, FIG. 12E, & FIG. 12I), 1.05 (FIG. 12B, FIG. 12F, & FIG. 12J), 2.1 (FIG. 12C, FIG. 12G, & FIG. 12K) and 6.3 (FIG. 12D, FIG. 12H, & FIG. 12L). Counter-rotating vortex pairs are marked with dashed circle and vortex shedding is marked by solid circle.
Figure 12E:
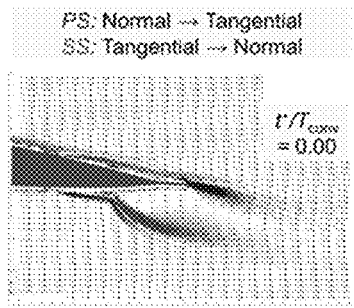
Figure 12I:
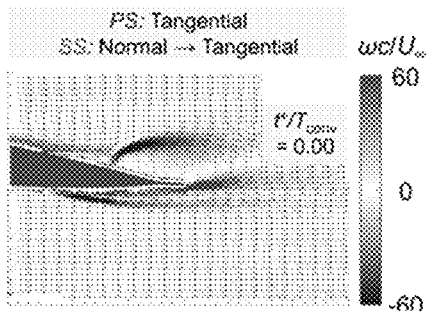
Figure 12B:
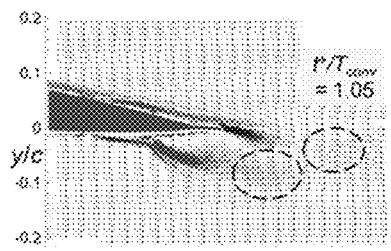
Figure 12F:
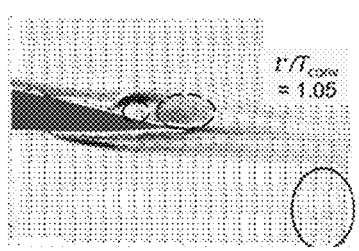
Figure 12J:
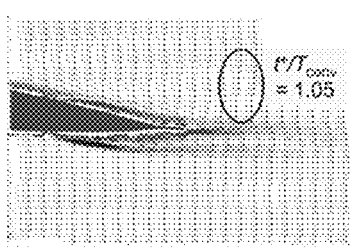
Figure 12C:
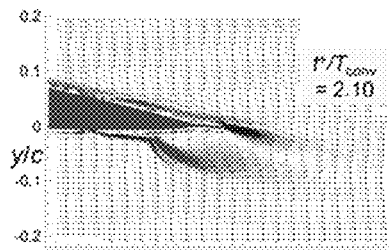
Figure 12G:
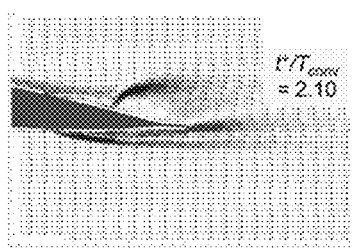
Figure 12K:
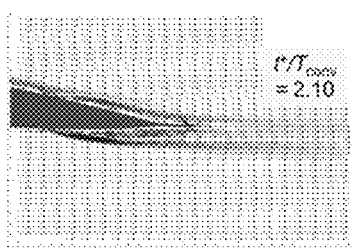
Figure 12D:
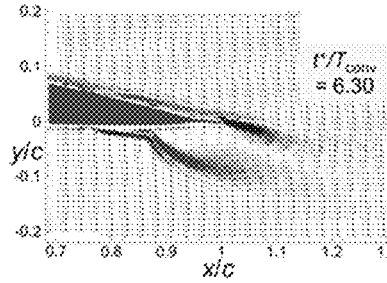
Figure 12H:
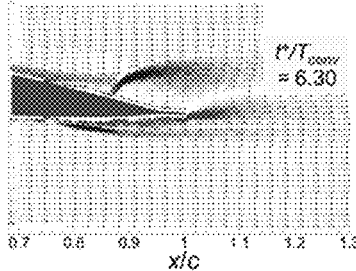
Figure 12L:
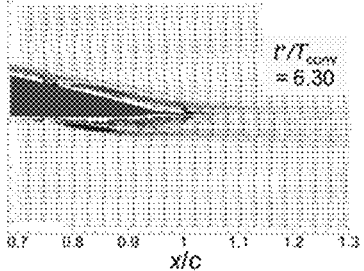

The transients associated with the onset of the PS normal actuation are shown in FIGS. 12A-D. The series starts (FIG. 12A) when the PS actuator is commanded to switch from tangential to normal. At $t^+/T_{conv}$=0 each of the PS and SS tangential jets forms two-sided shear layers bounded by vorticity layers of opposite sense (e.g., from top to bottom CCW and CW for the SS jet). The SS and PS surface boundary layers are also visible upstream of the tangential jet outlets (at x/c=0.75) which merge with the jet shear layers. The jet shear layers remain attached to the airfoil surface and are subsequently merged in the near wake (the jet shear layers on the pressure side are somewhat thicker). As noted in connection with FIG. 9a-c, at this time the airfoil's lift and pitching moment are the same as for unactuated baseline airfoil while drag is lower ($\Delta C_D$=−0.07). At $t^+/T_{conv}$=1.05 following the switching command (FIG. 12B) a jet is emanating from the normal outlet and its windward (CW) and leeward (CCW) shear layers are deflected downstream effecting a virtual camber. Entrainment of flow downstream of the orifice into the leeward shear layer of the jet (CCW) gives rise to a small recirculation bubble roughly spanning from the orifice to the trailing edge. The entrainment of flow from the SS shear layer results in the downward defection of the lower (CW) shear layer of the SS tangential actuation jet and CW vorticity layer forms on the PS surface downstream of the jet orifice underneath the recirculation bubble. The transitory deflection of the near wake and the concomitant downwash correspond to the rapid rise in $C_L$ following the onset of PS actuation in FIG. 6A. Also shown at $t^+/T_{conv}$=1.05 is the shedding of a pair of counter-rotating vorticity concentrations (marked by dashed circles) near the trailing edge, thereby modifying the vorticity flux and circulation. The effects of PS normal actuating intensify with time as seen in FIGS. 12C-D where the near wake downward deflection increases and is accompanied by the growth of the closed recirculation bubble downstream of the orifice. The reversed flow domain extends from x/c=1.02 at $t^+/T_{conv}$=1.05 to x/c=1.08 when the nominally-asymptotic stage is reached (FIG. 12D). These topological features of trailing edge flow under the influence of PS actuation as described above are sustained as long as actuation is present. It is noted that the presence of the SS tangential actuation jet limits entrainment of SS fluid by the PS actuation jet which may explain the reduction in control authority compared to PS actuation when SS jet is off.

At the onset of the next transition in FIG. 12E, the PS actuator is switched to its tangential outlet and the SS actuator switches from tangential to normal outlets. At this time ($t^+/T_{conv}$=0), the flow conditions are identical to the previous asymptotic state (FIG. 12D). By $t^+/T_{conv}$=1.05 (FIG. 12F), the flow on the pressure side reverts to tangential actuation (as in FIG. 12A) and sheds additional CW vorticity into the wake (marked by solid circle). On the suction side, the normal actuation jet is just beginning to penetrate into the cross flow and a pair of counter-rotating starting vortices is generated and is embedded within the surface boundary layer. The corresponding lift is somewhat lower than at the start of the transition ($\Delta C_L$=+0.25 vs +0.34), but still higher than the unactuated baseline. As the normal jet on suction side continues to develop in FIG. 12G, the vortex pair in FIG. 12F is shed into the wake and the upstream boundary layer flow begins to merge into the jet's windward vorticity layer (CCW). The entrainment of trailing edge flow from downstream of the jet orifice and from the pressure side engenders a small circulation bubble for 0.88<x/c<1.04, similar to those observed in FIG. 12C which is akin to a decrease in virtual camber. Reverse flow from the pressure side shear layer entrained into the suction side jet leeward shear layer forms a thin layer of CCW vorticity along the suction surface on the trailing edge that is of the opposite sense to the lift generating circulation. Steady state is reached at $t^+/T_{conv}$=6.3 (FIG. 12H) when the trailing edge circulation bubble is within the domain to 0.88<x/c<1.06 and upward wake deflection becomes most prominent with $\Delta C_L$ reaches asymptotic minimum −0.33.

The third transient shown in FIGS. 12I-L illustrates the relaxation process from SS normal to tangential actuation. At $t^+/T_{conv}$=0 (FIG. 12I) the command is sent to the SS actuator to switch from normal output to tangential output; the PS actuator remains in tangential output. At $t^+/T_{conv}$=1.05 (FIG. 12J) the switching is complete as evidenced by the collapse of the deflected suction surface vorticity layer and the wake. In addition, a CW vortex is shed from the trailing edge into the wake (highlighted by the solid circle) which is consistent with the transient increase in lift. In the subsequent PIV images in FIGS. 12K-L, the flow appears to gradually return to the initial starting condition of the cycle (shown in FIG. 12A) where the two shear layers associated with tangential actuating on PS and SS are attached to the trailing edge of the airfoil and merge in the wake. Lift recovers to the unactuated baseline level by $t^+/T_{conv}$=6.3.

Figure 13A:
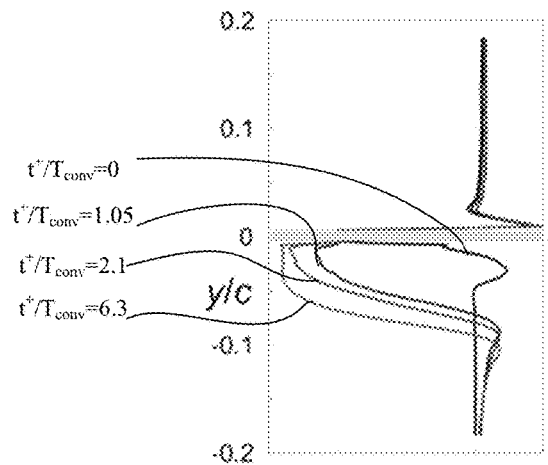
FIG. 13A, FIG. 13B, FIG. 13C, FIG. 13D, FIG. 13E, and FIG. 13F provide time-dependent evolution of the normalized streamwise velocity u*=u(y)/U∞ (FIG. 13A, FIG. 13B, and FIG. 13C) and vorticity flux distributions=ω(y)·u(y)·c/U∞2 (FIG. 13D, FIG. 13E, and FIG. 13F) at x/c=0.98 during the onset of PS actuation (FIG. 13A & FIG. 13D), onset of SS actuation (FIG. 13B & FIG. 13E) and relaxation (FIG. 13C & FIG. 13F) with t+/Tconv=0, 1.05, 2.1, 6.3 from start of each transition (center line in each figure is the airfoil body), in accordance with an embodiment of the disclosure.
Figure 13D:
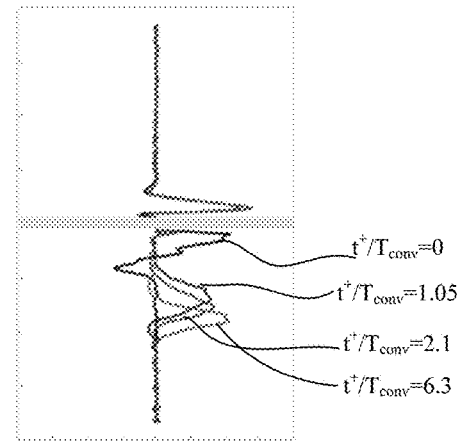
Figure 13B:
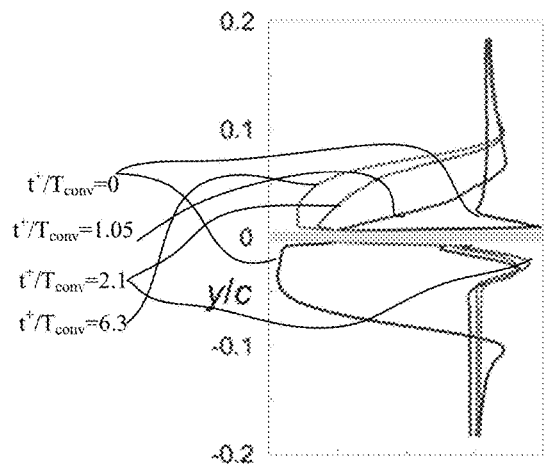
Figure 13E:
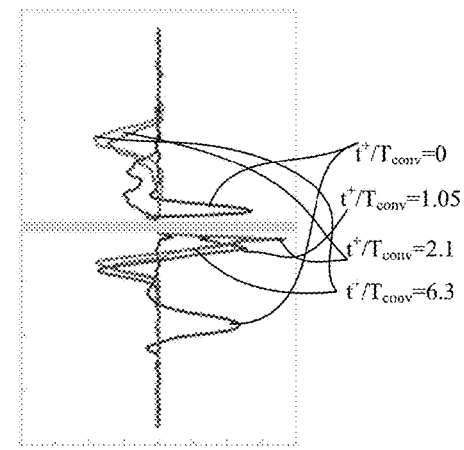

The transitory modification of the trailing edge flow attained by combination of independent PS and SS pulsed fluidic actuation is further illustrated by analyzing the time-dependent evolution of the cross-stream distributions of the streamwise velocity and spanwise vorticity flux downstream of the trailing edge (x/c=0.98, FIG. 13) that are extracted from the three actuation transitions in FIG. 12. In FIG. 13A, the PS and SS tangential jets at $t^+/T_{conv}$=0 form the peaks in streamwise velocity (−0.004<y/c<0.050 for PS and 0.006<y/c<0.025 for SS). At $t^+/T_{conv}$=1.05 the tangential jet switches to a closed recirculation bubble where the reverse flow region (u*<0 at −0.004>y/c>−0.037) marks trailing edge flow that is entrained upstream into the leeward shear layer of the normal PS jet located between −0.037>y/c>−0.136. Here, u*>1 for y/c<−0.136 due to freestream entrained and accelerated by the actuation jet. The windward shear layer is not visible because it is cancelled by the interaction with freestream before reaching the trailing edge. As time progresses, this recirculating region grows in size and strength until the asymptotic state is reached at $t^+/T_{conv}$=6.3. Suction side velocity profiles (y/c>0.006) show that PS switching has no appreciable effects on the SS trailing edge flow. The corresponding cross-stream distributions of the normalized flux of CW [ω(y)<0] and CCW [ω(y)>0] spanwise vorticity concentrations $\zeta=\omega(y)\cdot u(y)\cdot c/U_\infty^2$ in FIG. 13B show the downstream transport of CCW and CW vorticity by PS tangential jet at $t^+/T_{conv}$0 marked by the regions of positive [u(y)>0, ω(y)>0] and negative [u(y)>0, ω(y)<0] flux. The CW vorticity layer on SS is not resolved (too close to surface) and is only marked by a positive peak. When the normal jet on PS is activated, the flow topology is significantly altered. For $t^+/T_{conv}$=1.05, the domain of $\zeta$>0 is associated with the downstream transport of CCW vorticity in the leeward shear layer of the normal jet (−0.042>y/c>−0.088). The region of CCW flux narrows, intensifies and migrates downward with time as the flow gradually response to the impulsive switching of the PS jet while vorticity flux on SS is unaffected, indicating an increase in the bounded lift generating circulation.

During the concurrent relaxation of PS and onset of SS actuation in FIG. 13B, PS velocity distributions quickly returned to the original state associated with tangential actuation in FIG. 13A, while SS streamwise velocity distributions show the formation and growth of a circulation bubble similar to PS profiles in the previous transition. Likewise in FIG. 13E, the domain of downstream flux of the CCW vorticity on the pressure side developed into a pair of positive and negative $\zeta$ peaks which are associated with the downstream transport of the CCW and CW vorticity in the PS tangential jet and remains largely unchanged thereafter. On the suction side, initially following the onset of SS actuation, two small peaks of the negative vorticity flux are detected. The first peak (y/c=0.030) corresponds to the CW component of the counter-rotating vortex pair generated by the impulsive start of the normal actuation jet mentioned in discussion on FIG. 12F. The second peak (y/c=0.051) is associated with the downstream transport of the leeward shear layer from the normal jet. In subsequent profiles, the starting vortex pair is shed from the suction surface and the first negative peak disappears, while the downstream flux of CW vorticity from the leeward jet layer intensifies and moves upward as the trailing edge flow is entrained and deflected by the normal jet.

Figure 13C:
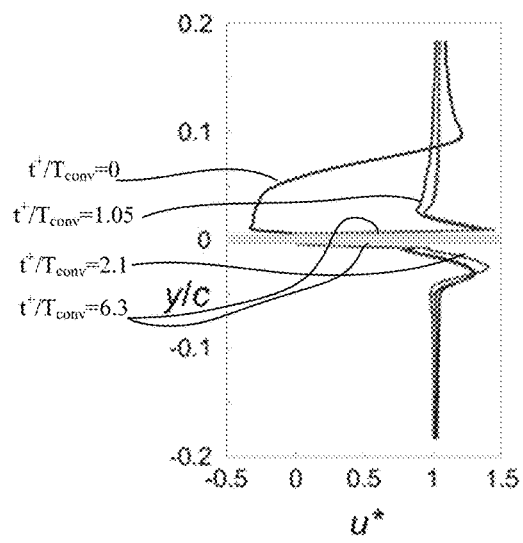
Figure 13F:
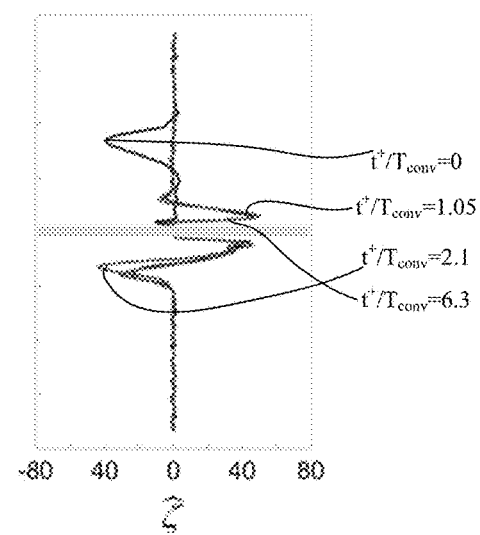

Lastly, during the relaxation phase, the distributions of the PS velocity and vorticity flux are mostly invariant since the PS jet is not activated. FIG. 13C shows the complete collapse of the circulation bubble on the suction surface as a result of the transition of the SS actuation jet to tangential actuation. The SS streamwise velocity increases slightly with time as more of the cross flow is entrained by the tangential shear layer, resulting in gradual increase in circulation as lift recovers to the baseline level at $t^+/T_{conv}$=6.3. The suction surface vorticity flux distributions in FIG. 13F changes from negative (downstream transport of CW vorticity in normal jet leeward shear layer) to positive (downstream transport of CCW in tangential jet shear layer) immediately following the onset of SS jet relaxation and remained constant during the transition.

Figure 14:
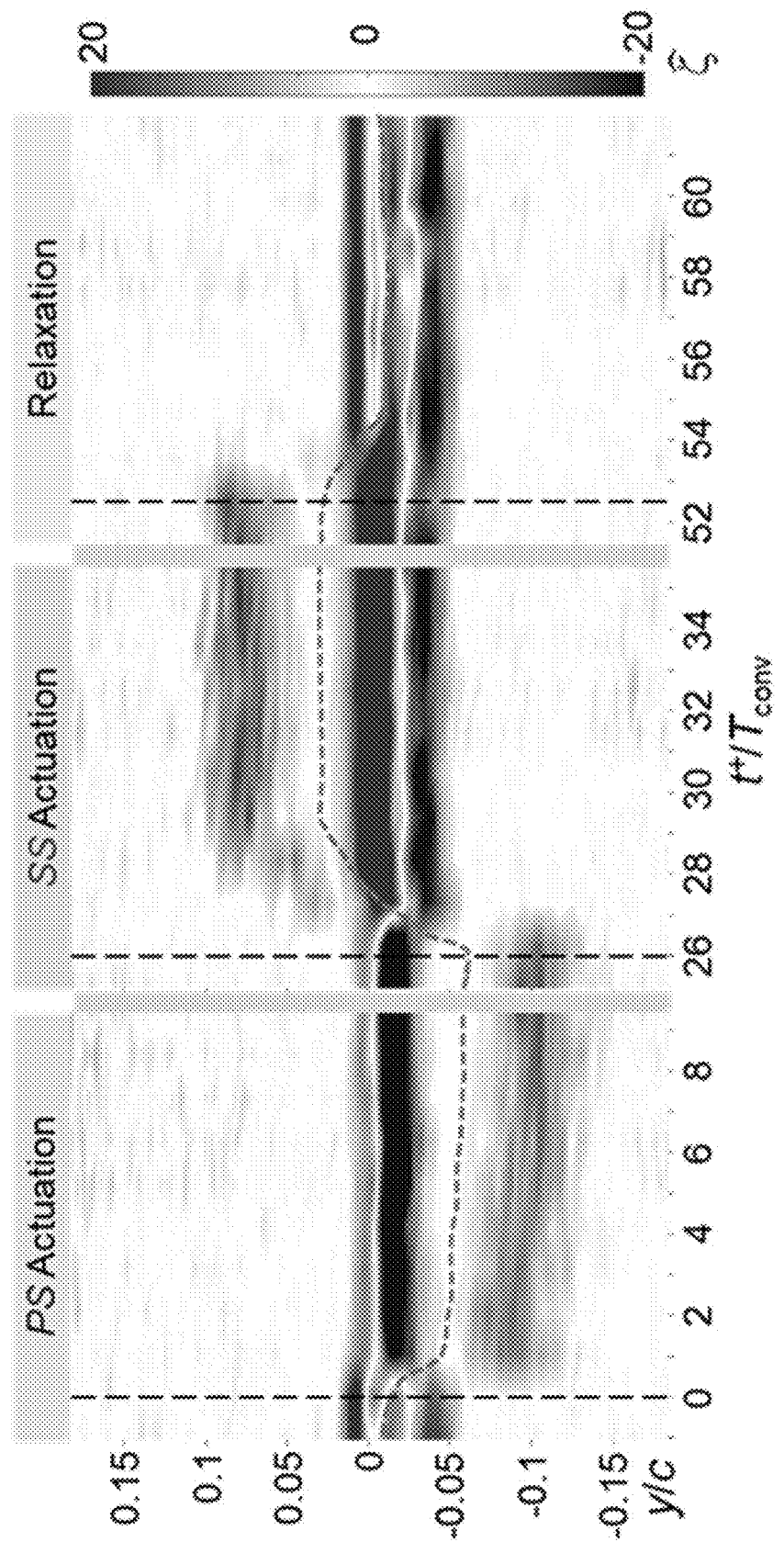
FIG. 14 provides raster plots of the vorticity flux in the near wake (x/c=1.08) of the airfoil at equal time increments following onset of PS actuation (left), SS actuation (middle) and relaxation (right) (dashed vertical lines mark the trigger of each actuation command and dashed curved lines mark the center of the wake), in accordance with an embodiment of the disclosure.

The full ensemble of PIV data acquired at equally spaced time increments (1.05 $T_{conv}$) phase-locked to the actuation waveform is used to map the velocity and vorticity fields in the near wake of the airfoil. These measurements capture the entire cross-stream width of the wake and are used to compute the time-dependent vorticity flux across the wake at x/c=1.08 during the top-hat coupled PS and SS actuation. FIG. 14 shows color raster plots of the cross-stream distributions of positive and negative vorticity flux for each time step. The streamwise location for this calculation is selected such that the streamwise velocity component for the entire wake is positive, thus the sign of $\zeta=\omega(y)\cdot u(y)\cdot c/U_\infty^2$ is consistent with the sense of the vorticity ω(y) and offers insights into the transitory shedding of circulation into the wake. Dashed vertical lines in FIG. 14 marks the timing of the triggers for PS and SS actuation, and their relaxation and the cross-stream location of the wake center is marked by the dashed green line.

Prior to the PS actuation ($t^+/T_{conv}<0$), the vorticity flux in the wake primarily comprises four concentrated bands of CCW and CW vorticity layers above and below the trailing edge. The top two layers (CCW and CW, from top to bottom) are associated with the shear layers in the SS tangential actuation jet while the bottom two layers are associated with the PS tangential actuation jet (the PS jet is slightly wider than the SS jet, 0.053 c vs 0.026 c, respectively) and the wake is thin and fully attached. Following the onset of PS actuation $t^+/T_{conv}=0$, the most prominent feature is the PS dual layers of vorticity merging in to a much wider and more diffused layer of CCW vorticity flux and the concomitant downward deflection of the wake center that is associated with increase in virtual camber and lift. The widening of the wake vorticity flux on the pressure side is accompanied by increased shedding of CCW vorticity corresponding to temporal increase in lift. Meanwhile, the suction side vorticity layers migrate downward slightly and while the upper layer remains mostly invariant. The lower (CW) vorticity layer widens as part of the flow is entrained into the PS actuation jet. After the onset of SS actuation and the concurrent relaxation of PS actuation at $t^+/T_{conv}=26$, the pressure side wake collapses into two layers of CCW and CW vorticity while SS wake separates as the predominantly CW vorticity in the SS normal jet is shed into the wake. In contrast to PS actuation, the wake center is deflected upward, and lift decreases significantly. The relaxation of SS actuation commences at $t^+/T_{conv}=52.5$ where the SS wake collapses and the wake center returns to neutral position. The cross-stream width of the top (CCW) shear layer of the PS jet is reduced slightly as it interacts with the CW shear layer of the SS tangential jet. At this time, lift is gradually recovered from the effects of SS actuation and flow returns to initial condition at the beginning of the cycle.

Conclusions of Experimental Validation

In this investigation, the aerodynamic loads on a wind tunnel VR-12 airfoil model are bi-directionally controlled at low to moderate angles of attack when the base flow is fully attached. Actuation is provided by a novel pulsed trailing edge actuator based on bi-stable fluidically selectable outputs that are impulsively switched between orifices tangential and normal to the airfoil's pressure and suction surfaces. The transient manipulation of the aerodynamic loads is explored using time-dependent force measurements and phase-locked particle image velocimetry over a range of angles of attack $0°\leq\alpha\leq12°$.

Step response of the lift, moment and drag to single-side (isolated) actuation pulses demonstrated that rapid transitory changes in lift and pitching moment of up to $\Delta C_L=+0.52/-0.41$ and $\Delta C_M=-0.08/+0.06$, respectively, can be attained. While the characteristic onset and termination times of the lift are each about 7 $T_{conv}$, the corresponding moment time scales are significantly shorter at about 4.2 and 1.7 $T_{conv}$, respectively. Time-periodic actuation using coupled PS and SS normal jets with varying frequency and pulse width indicated that the response of the base flow to pulsed trailing edge actuation is insensitive to the actuation sequence or the repetition rate. This coupled actuation engenders bi-directional increments of the aerodynamic loads of up to $\Delta C_L=+0.36/-0.32$ and $\Delta C_M=-0.04/+0.05$ that are comparable to the loads effected by mechanical control surfaces but at faster response (deployment) times and reduction in drag relative to the baseline (smooth) airfoil by up to $\Delta C_D=-0.03$ (in contrast to drag penalties incurred by mechanical flaps). Furthermore, the present measurements show that these characteristics are nearly invariant with $\alpha$.

Particle image velocimetry around the airfoil's trailing edge and in the near wake acquired phase-locked to the actuation waveform reveals details of the shedding of a starting vortex pair that is associated with the impulsive onset of the normal actuation jet followed by entrainment of the upstream boundary layer and the formation of a closed circulation bubble on its leeward side. The entrainment of flow in the wake by the normal jet is also accompanied by transport of opposite sense vorticity concentrations from the opposite surface of the airfoil as reverse flow is developed on the trailing edge surface downstream to the actuation nozzle. The change in lift force is attributed to up/downward deflection of the near wake and additional trapped vorticity as observed in the PIV. Cross-stream distributions of the near wake vorticity flux show that the onset of normal jet leads to merging of the upstream surface dual vorticity layer into a wider, diffused vorticity layer whose sense is consistent with the predominant leeward side vorticity in the normal jet being transported into the wake and the concomitant change (increase or decrease) in circulation. These results suggest that the present actuation approach offers a viable, lower drag alternative to mechanical (plain or moving micro-flaps) control surfaces for vibration suppression on airfoils.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. An airfoil comprising:
   a trailing edge having a first surface and a second surface opposing the first surface;
   a first fluidic outlet and a second fluidic outlet each positioned on the same surface of the one of the first or second surfaces;
   a first fluid supply configured to eject a fluid out of the first and second fluidic outlets to alter an aerodynamic load experienced by the airfoil; and a first fluidic bypass switch in fluid communication with the first and second fluidic outlets, the first fluidic bypass switch configured to provide three fluid output configurations:
- a first fluid output configuration in which fluid from the first fluid supply is ejected from the first fluidic outlet;
- a second fluid output configuration in which fluid from the first fluid supply is ejected from the second fluidic outlet; and
- a third fluid output configuration in which fluid from the first fluid supply is ejected from neither the first fluidic outlet nor the second fluidic outlet.

2. The airfoil of claim 1, wherein the first fluidic outlet is positioned on the first surface of the trailing edge;
wherein the first fluidic outlet is configured such that fluid ejected from the first fluidic outlet is ejected in a direction tangential to the first surface of the trailing edge; and
wherein the airfoil is configured to generate lift.

3. The airfoil of claim 1 further comprising first and second control jets configured to cause the fluid from the first fluid supply to be ejected from only one of the first fluidic outlet and the second fluidic outlet at a predetermined time.

4. The airfoil of claim 3 further comprising a first mixing chamber in fluid communication with the first and second control jets, the first fluid supply, the first fluidic outlet, and the second fluidic outlet;
wherein the first mixing chamber is configured such that:
when fluid is ejected from the first control jet, fluid from the first control jet and first fluid supply enters the first mixing chamber and exits the first mixing chamber and is ejected from the first fluidic outlet; and
when fluid is ejected from the second control jet, fluid from the second control jet and first fluid supply enters the first mixing chamber and exits the first mixing chamber and is ejected from the second fluidic outlet.

5. The airfoil of claim 1, wherein:
the fluid is a compressible fluid; and
the airfoil is free of mechanical control surfaces.

6. The airfoil of claim 1, wherein:
the fluid is air; and
the airfoil is free of mechanical control surfaces.

7. An airfoil comprising:
a trailing edge having a first surface and a second surface opposing the first surface;
a first fluidic outlet and a second fluidic outlet each positioned on the first surface of the trailing edge; and
a first fluid supply configured to eject a fluid out of the first and second fluidic outlets to alter an aerodynamic load experienced by the airfoil;
wherein the first fluidic outlet is configured such that fluid ejected from the first fluidic outlet is ejected in a direction tangential to the first surface of the trailing edge; and
wherein the second fluidic outlet is configured such that fluid ejected from the second fluidic outlet is ejected in a direction normal to the first surface of the trailing edge.

8. The airfoil of claim 7 further comprising first and second control jets configured to cause the fluid from the first fluid supply to be ejected from only one of the first fluidic outlet and the second fluidic outlet at a predetermined time.

9. The airfoil of claim 8 further comprising a first mixing chamber in fluid communication with the first and second control jets, the first fluid supply, the first fluidic outlet, and the second fluidic outlet;
wherein the first mixing chamber is configured such that:
when fluid is ejected from the first control jet, fluid from the first control jet and first fluid supply enters the first mixing chamber and exits the first mixing chamber and is ejected from the first fluidic outlet; and
when fluid is ejected from the second control jet, fluid from the second control jet and first fluid supply enters the first mixing chamber and exits the first mixing chamber and is ejected from the second fluidic outlet.

10. The airfoil of claim 8 further comprising a first fluidic bypass switch in fluid communication with the first and second fluidic outlets, the first fluidic bypass switch configured to provide three fluid output configurations:
a first fluid output configuration in which fluid from the first fluid supply is ejected from the first fluidic outlet;
a second fluid output configuration in which fluid from the first fluid supply is ejected from the second fluidic outlet; and
a third fluid output configuration in which fluid from the first fluid supply is ejected from neither the first fluidic outlet nor the second fluidic outlet.

11. The airfoil of claim 7 further comprising:
a third fluidic outlet on the second surface of the trailing edge;
a fourth fluidic outlet on the second surface of the trailing edge; and
a second fluid supply configured to eject a fluid out of the third fluidic outlet and fourth fluidic outlet to alter an aerodynamic load experienced by the airfoil;
wherein the third fluidic outlet is configured such that fluid ejected from the third fluidic outlet is ejected in a direction tangential to the second surface of the trailing edge; and
wherein the fourth fluidic outlet is configured such that fluid ejected from the fourth fluidic outlet is ejected in a direction normal to the second surface of the trailing edge.

12. The airfoil of claim 11 further comprising third and fourth control jets configured to cause the fluid from the second fluid supply to be ejected from only one of the third fluidic outlet and the fourth fluidic outlet at a predetermined time.

13. The airfoil of claim 12 further comprising a second mixing chamber in fluid communication with the third and fourth control jets, the second fluid supply, the third fluidic outlet, and the fourth fluidic outlet;
wherein the second mixing chamber is configured such that:
when fluid is ejected from the third control jet, fluid from the third control jet and second fluid supply enters the second mixing chamber and exits the second mixing chamber and is ejected from the third fluidic outlet; and
when fluid is ejected from the fourth control jet, fluid from the fourth control jet and second fluid supply enters the second mixing chamber and exits the second mixing chamber and is ejected from the fourth fluidic outlet.

14. The airfoil of claim 12 further comprising a second fluidic bypass switch in fluid communication with the third and fourth fluidic outlets, the second fluidic bypass switch configured to provide three fluid output configurations:
- a first fluid output configuration in which fluid from the second fluid supply is ejected from the third fluidic outlet;
- a second fluid output configuration in which fluid from the second fluid supply is ejected from the fourth fluidic outlet; and
- a third fluid output configuration in which fluid from the second fluid supply is ejected from neither the third fluidic outlet nor the fourth fluidic outlet.

15. The airfoil of claim 7, wherein the fluid is a compressible fluid.

16. The airfoil of claim 7, wherein the fluid is air.

17. The airfoil of claim 7, wherein the airfoil is free of mechanical control surfaces.

18. An airfoil comprising:
- a trailing edge having a first upper, suction surface and a second lower, pressure surface opposing the first surface, wherein the airfoil is configured to generate lift;
- at least one fluidic outlet positioned on the first surface; and
- at least one fluidic outlet positioned on the second surface;
- wherein a controlled ejecting of a fluid from one or more of the at least one fluidic outlet positioned on the first surface and from one or more of the at least one fluidic outlet positioned on the second surface bi-directionally alters aerodynamic loads experienced by the airfoil;
- wherein a first of the at least one fluidic outlet positioned on the first surface is oriented such that fluid ejected from the first fluidic outlet exits the first fluidic outlet in a direction tangential to the first surface; and
- wherein a second of the at least one fluidic outlet positioned on the first surface is oriented such that fluid ejected from the second fluidic outlet exits the second fluidic outlet in a direction normal to the first surface.

19. The airfoil of claim 18, wherein a third of the at least one fluidic outlet positioned on the second surface is oriented such that fluid ejected from the third fluidic outlet exits the third fluidic outlet in a direction tangential to the second surface; and
- wherein a fourth of the at least one fluidic outlet positioned on the second surface is oriented such that fluid ejected from the fourth fluidic outlet exits the fourth fluidic outlet in a direction normal to the second surface.

20. The airfoil of claim 18, wherein the fluid is air.

* * * * *